United States Patent
Stolfo et al.

(10) Patent No.: US 8,789,172 B2
(45) Date of Patent: Jul. 22, 2014

(54) METHODS, MEDIA, AND SYSTEMS FOR DETECTING ATTACK ON A DIGITAL PROCESSING DEVICE

(75) Inventors: Salvatore J. Stolfo, Ridgewood, NJ (US); Wei-Jen Li, Rego Park, NY (US); Angelos D. Keromylis, New York, NY (US); Elli Androulaki, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1010 days.

(21) Appl. No.: 12/406,814

(22) Filed: Mar. 18, 2009

(65) Prior Publication Data

US 2010/0064369 A1    Mar. 11, 2010

Related U.S. Application Data

(63) Continuation-in-part of application No. PCT/US2007/078773, filed on Sep. 18, 2007.

(60) Provisional application No. 60/845,563, filed on Sep. 18, 2006, provisional application No. 61/096,795, filed on Sep. 13, 2008.

(51) Int. Cl.
*G06F 11/00* (2006.01)

(52) U.S. Cl.
USPC ............... 726/22; 726/23; 726/24; 726/25; 726/26; 726/27; 713/150; 713/188; 380/280; 705/59; 714/16; 714/19

(58) Field of Classification Search
CPC .............................................. H04N 21/44236
USPC ........... 726/22–27; 713/188, 150; 714/16, 19; 380/280; 705/59
See application file for complete search history.

(56) References Cited

U.S. PATENT DOCUMENTS 5,440,723 A    8/1995  Arnold et al.
5,701,464 A    12/1997 Aucsmith
(Continued)

FOREIGN PATENT DOCUMENTS

WO    WO 2005047862    6/2006

OTHER PUBLICATIONS

The International Search Report and the Written Opinion of the International Searching Authority, International Patent Application No. PCT/US07/78773, Mar. 12, 2008.

(Continued)

*Primary Examiner* — Thanhnga B Truong
(74) *Attorney, Agent, or Firm* — Byrne Poh LLP

(57) ABSTRACT

Methods, media, and systems for detecting attack are provided. In some embodiments, the methods include: comparing at least part of a document to a static detection model; determining whether attacking code is included in the document based on the comparison of the document to the static detection model; executing at least part of the document; determining whether attacking code is included in the document based on the execution of the at least part of the document; and if attacking code is determined to be included in the document based on at least one of the comparison of the document to the static detection model and the execution of the at least part of the document, reporting the presence of an attack. In some embodiments, the methods include: selecting a data segment in at least one portion of an electronic document; determining whether the arbitrarily selected data segment can be altered without causing the electronic document to result in an error when processed by a corresponding program; in response to determining that the arbitrarily selected data segment can be altered, arbitrarily altering the data segment in the at least one portion of the electronic document to produce an altered electronic document; and determining whether the corresponding program produces an error state when the altered electronic document is processed by the corresponding program.

24 Claims, 28 Drawing Sheets

(56) References Cited

U.S. PATENT DOCUMENTS

| | | | |
|---|---|---|---|
| 5,889,943 A * | 3/1999 | Ji et al. ............................ | 726/22 |
| 5,991,714 A | 11/1999 | Shaner | |
| 6,081,325 A | 6/2000 | Leslie et al. | |
| 6,697,950 B1 | 2/2004 | Ko | |
| 7,236,610 B1 | 6/2007 | Luo et al. | |
| 7,325,185 B1 | 1/2008 | Szor | |
| 7,478,233 B2 * | 1/2009 | Olson et al. ................... | 713/150 |
| 7,805,460 B2 | 9/2010 | Artan et al. | |
| 2002/0073055 A1 | 6/2002 | Chess et al. | |
| 2003/0014662 A1 | 1/2003 | Gupta et al. | |
| 2003/0182310 A1 | 9/2003 | Charnock et al. | |
| 2003/0229810 A1 | 12/2003 | Bango | |
| 2004/0111410 A1 | 6/2004 | Burgoon et al. | |
| 2005/0022028 A1 | 1/2005 | Hall | |
| 2005/0108562 A1 | 5/2005 | Khazan et al. | |
| 2005/0249214 A1 | 11/2005 | Peng | |
| 2005/0273698 A1 | 12/2005 | Smith et al. | |
| 2006/0015630 A1 | 1/2006 | Stolfo et al. | |
| 2006/0036570 A1 | 2/2006 | Schaefer et al. | |
| 2006/0129603 A1 | 6/2006 | Park et al. | |
| 2006/0149674 A1 | 7/2006 | Cook et al. | |
| 2007/0234070 A1 | 10/2007 | Horning et al. | |
| 2008/0010538 A1 | 1/2008 | Satish et al. | |
| 2008/0178299 A1 | 7/2008 | Merkle et al. | |
| 2008/0189784 A1 | 8/2008 | Mangione-Smith et al. | |
| 2008/0215891 A1 | 9/2008 | Horne et al. | |
| 2009/0172815 A1 | 7/2009 | Gu et al. | |

OTHER PUBLICATIONS

"A Visual Data Hash Method", Air Force Research Report, Oct. 2004.
Abou-Assaleh, T., et al., "Detection of New Malicious Code Using N-grams Signatures" Proceedings of Second Annual Conference on Privacy, Security and Trust, Oct. 13-15, 2004.
Abou-Assaleh, T., et al., "N-Gram-Based Detection of New Malicious Code", In Proceedings of the 28th IEEE Annual International Computer Software and Applications Conference, (COMPSAC 2004), Sep. 28-30, 2004, Hong Kong.
Aha, D.W., et al., Instance-Based Learning Algorithms, "Machine Learning", vol. 6, Issue 1, 1991, pp. 37-66.
Apap, F., et al., "Detecting Malicious Software by Monitoring Anomalous Windows Registry Accesses", Proceedings of the 5th International Symposium on Recent Advances in Intrusion Detection (RAID), Zurich, Switzerland, Oct. 16-18, 2002.
Arnold, W., "Automatically Generated Win32 heuristic Virus Detection", Virus Bulletin Conference, Sep. 2000, pp. 51-60.
Barrantes, G., et al., "Randomized Instruction Set Emulation to Disrupt Binary Code Injection Attacks", Proccedings of the 10th ACM Conference on Computer and Communications Security (CCS) Conference, Oct. 2003, p. 281-289.
Barreno, M., et al. "Can Machine Learning Be Secure?", In Proceedings of the 2006 ACM Symposium on Information, Computer and Communications (ASIACCS'06), Mar. 21-24, 2006, Taipei, Taiwan, pp. 16-25.
Bhatkar, S., "Address Obfuscation: An Efficient Approach to Combat a Broad Range of Memory Error Exploits", In Proceedings of the 12th USENIX Security Symposium, Aug. 4-8, 2003, Washington, DC, USA, pp. 105-120.
Bloom B.H., "Space/Time Trade-Offs in Hash Coding with Allowable Errors", Communications of the ACM, vol. 13 No. 7, Jul. 1970, p. 422-426.
Bontchev, V., "Macro Virus Identification Problems", In Computers & Security, vol. 17, No. 1, 1998, pp. 69-89.
Busser, P., "Memory Protection with PaX and the Stack Smashing Protector: Breaking out Peace", Linux Magazine, Mar. 2004, pp. 36-39.
Christodorescu, M. and Jha, S., "Static Analysis of Executables to Detect Malicious Patterns", In Proceedings of the 12th USENIX Security Symposium, Washington, D.C., USA, Aug. 4-8, 2003, pp. 169-186.

Cover, T.M. and Hart, P.E., "Nearest Neighbor Pattern Classification", in IEEE Transactions on Information Theory, vol. 13, No. 1, Jan. 1967, pp. 21-27.
Cowan, C., et al. "Stackguard: Automatic Adaptive Detection and Prevention of Buffer-Overflow Attacks", In Proceedings of the 7th USENIX Security Symposium, Jan. 26-29, 1998, San Antonio, Texas, USA, San Antonio, Texas, Jan. 1998, pp. 63-78.
Cowan, C., et al., "PointGuard: Protecting Pointers From Buffer Overflow Vulnerabilities", In Proceedings of the 12th USENIX Security Symposium, Aug. 4-8, 2003, Washington, DC, USA, pp. 91-104.
Crandall, J.R., et al., "On Deriving Unknown Vulnerabilities from Zero-Day Polymorphic and Metamorphic Worm Exploits", In Proceedings of the 12th ACM Conference on Computer and Communication Security (CCS), Nov. 7-11, 2005, Alexandria, VA, USA.
Damashek, M., "Gauging Similarity with N-Grams: Language-Independent Categorization of Text", Science, vol. 267, No. 5199, Feb. 10, 1995, pp. 843-848.
De Maesschalck, R., et al., "The Mahalanobis Distance", Chemometrics and Intelligent Laboratory Conference Systems, vol. 50, No. 1, 2000, pp. 1-18.
Detristan, T., et al., "Polymorphic Shellcode Engine Using Spectrum Analysis", Phrack 2003 [cited Mar. 28, 2006]; Available from: http://www.phrack.org/issues.html?issue=61&id=9.
Dharmapurikar, S., et al., "Deep Packet Inspection Using Parallel Bloom Filters", In IEEE Micro, vol. 24, No. 1, Jan.-Feb. 2004, pp. 52-61.
Evers, J., "Zero-Day Attacks Continue to Hit Microsoft", CNET News, Sep. 27, 2006, Available at http://news.cnet.com/Zero-day-attacks-continue-to-hit-Microsoft/2100-7349_3-6120481.html?tag=mncol;1n.
Feng, H.H., et al., "Anomaly Detection Using Call Stack Information", Proceedings of the IEEE Symposium on Security and Privacy, May 2003.
Fiveash, K., "Attackers Hose Down Microsoft's Jet DB Engine", Mar. 26, 2008, http://www.channelregister.co.uk/2008/03/26/jet_database_engine_security_flaws.
Fogla, P. and Lee, W., "Evading Network Anomaly Detection Systems: Formal Reasoning and Practical Techniques", in Proceedings of the 13th ACM Conference on Computer and Communications Security (CCS), 2006, pp. 59-68.
Forrest, S., et al., "A Sense of Self for Unix Processes", In Proceedings of the IEEE Symposium on Research in Security and Privacy, Washington, DC, USA, 1996, pp. 120-128.
Goel, S., "Kolmogorov Complexity Estimates for Detection of Viruses", Complexity Journal, vol. 9, No. 2, Nov.-Dec. 2003.
Hirschberg, D.S., "A Linear Space Algorithm for Computing Maximal Common Subsequences", Communications of the ACM, vol. 18 No. 6, Jun. 1975, pp. 341-343.
International Patent Application No. PCT/US2007/05406, filed Feb. 28, 2007.
International Patent Application No. PCT/US2007/05408, filed Feb. 28, 2007.
International Patent Application No. PCT/US2009/056623, filed Sep. 11, 2009.
International Preliminary Report on Patentability in International Patent Application No. PCT/US07/5406, filed Feb. 28, 2007, mailed Sep. 12, 2008.
International Preliminary Report on Patentability in International Patent Application No. PCT/US2007/05408, filed Feb. 28, 2007, mailed Sep. 12, 2008.
International Preliminary Report on Patentability in International Patent Application No. PCT/US2007/078773, filed Sep. 18, 2007, mailed Apr. 2, 2009.
International Preliminary Report on Patentability in International Patent Application No. PCT/US2009/056623, filed Sep. 11, 2009, mailed Mar. 24, 2011.
International Search Report in International Patent Application No. PCT/US2007/05406, filed Feb. 28, 2007, mailed Mar. 31, 2008.
International Search Report in International Patent Application No. PCT/US2007/05408, filed Feb. 28, 2007, mailed Mar. 6, 2008.
International Search Report in International Patent Application No. PCT/US2009/056623, filed Sep. 11, 2009, mailed Apr. 22, 2010.

(56) References Cited

OTHER PUBLICATIONS

Jiang, X., et al., "RandSys: Thwarting Code Injection Attacks with System Service", Proceedings of the 26th IEEE International Symposium on Reliable Distributed Systems, 2007.

Karim, M.E., et al., "Malware Phylogeny Generation using Permutations of Code", Journal in Computer Virology, 2005.

Kc, G.S. et al., "Countering Code-Injection Attacks With Instruction-Set Randomization", In Proceedings of the 10th ACM Computer and Communications Security (CCS), 272-280, Oct. 27-30, 2003, Washington DC, USA, pp. 272-280.

Kephart, J.O., et al. "Automatic Extraction of Computer Virus Signatures", In Proceedings of the 4th Virus Bulletin International Conference. R. Ford, ed., Abingdon, England, 1994, pp. 178-184.

Kim, H. and Karp, B., "Autograph: Toward Automated, Distributed Worm Signature Detection", In Proceedings of the 13th USENIX Security Symposium, Aug. 9-13, 2004, San Diego, CA, USA, pp. 271-286.

Kolesnikov, O. and Lee, W., "Advanced Polymorphic Worms: Evading IDS by Blending in with Normal Traffic", in USENIX Security Symposium, Georgia Tech: Vancouver, BC, Canada, 2006.

Krebs, B., "Cyber Attacks Target Pro-Tibet Groups", Washington Post, Mar. 21, 2008, http://www.washingtonpost.com/wp-dyn/content/article/2008/03/21/AR2008032102605. html.

Kreibich, C. and Crowcroft, J., "Honeycomb—Creating Intrusion Detection Signatures Using Honeypots", in ACM Workshop on Hot Topics in Networks, Boston, MA, USA, 2003.

Kruegel, C., et al. "Automating Mimicry Attacks Using Static Binary Analysis", Proceedings of the 14th conference on USENIX Security Symposium (SSYM '05), 2005, pp. 161-176.

Kruegel, C., et al., "Polymorphic Worm Detection Using Structural Information of Executables", In Proceedings of the 8th International Symposium on Recent Advances in Intrusion Detection (RAID), 2005, pp. 207-226.

Krugel, C., et al., "Service Specific Anomaly Detection for Network Intrusion Detection", In Proceedings of the Symposium on Applied Computing (SAC), Madrid, Spain, 2002.

Leyden, J., "Trojan Exploits Unpatched Word Vulnerability", The Register, May 22, 2006, available at: http://www.theregister.co.uk/2006/05/22/trojan_exploit_word_vuln/.

Lhee, K., et al., "Type-Assisted Dynamic Buffer Overflow Detection," in Proceedings of the 11th USENIX Security Symposium, Aug. 5-9, 2002, San Francisco, CA, USA, pp. 81-90.

Li, W. and Stolfo, S.J., "SPARSE: A Hybrid System to Detect Malcode-Bearing Documents", CU Tech. Report, Jan. 2008.

Li, W., et al., "A Study of Malcode-Bearing Documents", DIMVA. 2007.

Li, W.J. and Stolfo, S.J., "Thwarting Attacks in Malcode-Bearing Documents by Altering Data Sector Values", Sep. 9, 2008.

Li, W.J., et al., "Fileprints: Identifying File Types by N-Gram Analysis", 2005 IEEE Information Assurance Workshop.

Liang Z, and Sekar R, "Fast and Automated Generation of Attack Signatures: A Basis for Building Self-Protecting Servers", In Proceedings of the 12th ACM Conference on Computer and Communications Security (CCS), Nov. 7-11, 2005, Alexandria, VA, USA, pp. 213-222.

Locasto, M.E., et al. "Bloodhound: Searching Out Malicious Input in Network Flows for Automatic Repair Validation", Columbia University Department of Computer Science : New York, NY, 2006.

Locasto, M.E., et al., "Application Communities: Using Monoculture for Dependability", In Proceedings of the 1st Conference on Hot Topics in System Dependability (HotDep-05), Jun. 2005.

Locasto, M.E., et al., "FLIPS: Hybrid Adaptive Intrusion Prevention," In Proceedings of the 8th International Symposium on Recent Advances in Intrusion Detection (RAID), Sep. 2005, Seattle, WA, USA, pp. 82-101.

Locasto, M.E., et al.,, "Software Self-Healing Using Collaborative Application Communities", in Internet Society (ISOC) Symposium on Network and Distributed Systems Security, San Diego, CA, USA, 2006.

Marceau, C., "Characterizing the Behavior of a Program Using Multiple-Length N-Grams", Proceedings of the New Security Paradigms Workshop (NSPW '00), 2000, pp. 101-110.

McDaniel, M. And Hossain, H.M., "Content Based File Type Detection Algorithms", In Proceedings of the 36th Annual Hawaii International Conference on System Sciences (HICSS'03), 2003.

Microsoft Office Reference Schemas, 2003, available at: http://rep.oio.dk/Microsoft.com/officeschemas/schemasIntros.htm.

Microsoft Office Word 2007 Binary File Format Documentation, Microsoft, 2007.

Microsoft Security Bulletin 912840, "Vulnerability in Graphics Rendering Engine Could Allow Remote Code Execution", Jan. 5, 2006, http://www.microsoft.com/technet/security/advisory/912840.mspx.

Microsoft Security Bulletin MS06-001, "Vulnerability in Graphics Rendering Engine Could Allow Remote Code Execution (912919)", Jan. 5, 2006, available at: http://technet.microsoft.com/en-us/security/bulletin/ms06-001.

Moore, D., et al., "Internet Quarantine: Requirements for Containing Self-Propagating Code." In INFOCOM 2003.

Naor, M. and Yung, M., "Universal One-Way Hash Functions and their Cryptographic Applications", in ACM Symposium on Theory of Computing, Seattle, WA, USA, 1989.

National Vulnerability Database, "Vulnerability Summary for CVE 2006-5994", Dec. 6, 2006, available at: http://web.nvd.nist.gov/view/vuln/detail?vulnId=CVE-2006-5994.

National Vulnerability Database, "Vulnerability Summary for CVE-2006-3647", Oct. 10, 2006, available at: http://web.nvd.nist.gov/view/vuln/detail?vulnId=CVE-2006-3647.

National Vulnerability Database, "Vulnerability Summary for CVE-2007-3899", Oct. 9, 2007, available at: http://web.nvd.nist.gov/view/vuln/detail?vulnId=CVE-2007-3899.

Newsome J, et al. "Thwarting Signature Learning by Training Maliciously", In Proceedings of the IEEE 9th International Symposium on Recent Advances in Intrusion Detection (RAID) 2006.

Newsome, J., et al., "Polygraph: Automatically Generating Signatures for Polymorphic Worms", In Proceedings of the IEEE Security & Privacy Symposium, May 2005, pp. 226-241.

Oberheide, J., et al., "CloudAV: N-Version Antivirus in the Network Cloud", in the Proceedings of the 17th USENIX Security Symposium, 2008, pp. 91-106.

Office Action dated Mar. 13, 2012 in U.S. Appl. No. 12/280,970.

Office Action dated Apr. 11, 2012 in U.S. Appl. No. 12/280,969.

Parampalli, C., et al. "A Practical Mimicry Attack Against Powerful System-Call Monitors", ACM Symposium on Information, Computer, and Communications Security, Mar. 18-20, 2008, Tokyo, Japan, pp. 156-167.

Perdisci, R., et al. "Misleading Worm Signatures Generators Using Deliberate Noise Injection", In Proceedings of the IEEE Symposium on Security and Privacy, 2006.

Ramakrishna, M.V., et al., "A Performance Study of Hashing Functions for Hardware Applications", In Proceedings of the International Conference on Computing and Information (ICCI'94), 1994, 1621-1636.

Schultz, M.G., et al., "Data Mining Methods for Detection of New Malicious Executables", In Proceedings of the IEEE Symposium on Security and Privacy, Oakland, CA, USA, May 2001, pp. 38-49.

Secunia Advisory SA12758, "Microsoft Word Document Parsing Buffer Overflow Vulnerabilities", Oct. 7, 2004, available at: http://secunia.com/advisories/12758.

Sekar R, et al. "Specification-Based Anomaly Detection: A New Approach for Detecting Network Intrusions", In ACM Conference on Computer and Communications Security, Nov. 18-22, 2002, Washington, D.C., USA.

Shacham, H., et al., "On the Effectiveness of Address-Space Randomization", In Proceedings of the 11th ACM Conference on Computer and Communications Security (CCS), Oct. 2004, pp. 298-307.

Sidiroglou, S., et al. "Building a Reactive Immune System for Software Services", In Proceedings of the USENIX Annual Technical Conference, Apr. 2005, pp. 149-161.

Sidiroglou, S., et al., "A Dynamic Mechanism for Recovering from Buffer Overflow Attacks", in 8th Information Security Conference, Singapore, Sep. 20-23, 2005.

(56) References Cited

OTHER PUBLICATIONS

Singh, S., et al. "The EarlyBird System for Real-Time Detection of Unknown Worms", in ACM Workshop on Hot Topics in Networks, Boston, MA, USA, 2003.
Singh, S., et al., "Automated Worm Fingerprinting", In Proceedings of the 6th Symposium on Operating Systems Design & Implementation (OSDI), Dec. 2004, pp. 45-60.
Song, Y., et al., "On the Infeasibility of Modeling Polymorphic Shellcode", In Proceedings of the 14th ACM Conference on Computer and Communications Security (CCS), Oct. 29-Nov. 2, 2007, Alexandria, VA, USA, pp. 541-551.
Staniford, S., et al., "How to Own the Internet in Your Spare Time", In Proceedings of the 11th USENIX Security Symposium, Aug. 5-9, 2002, San Francisco, CA, USA, pp. 149-167.
Steganalysis, Dec. 2001, available at: http://niels.xtdnet.nl/stego/.
Stolfo, S., et al., "Towards Stealthy Malware Detection", Malware Detection Book, Springer Verlag, (Jha, Christodorescu, Wang, Eds.), 2006.
Stolfo, S.J., et al., "Fileprint analysis for Malware Detection", Technical Report, 2005.
Szor, P. and Ferrie, P., "Hunting for Metamorphic", Technical Report, Symantec Corporation, Jun. 2003.
Szor, P., "The Art of Computer Virus Research and Defense", Symantee Press, 2005.
Tan K.M.C., et al., "Undermining an Anomaly-Based Intrusion Detection System Using Common Exploits", In Symposium on Recent Advances in Intrusion Detection, Zurich, Switzerland, 2002, pp. 54-73.
Tan, K.M.C. and Maxion, R.A., "'Why 6?' Defining the Operational Limits of Stide, and Anomaly-Based Intrusion Detector", IEEE Symposium on Security and Privacy, Nov. 2001.
U.S. Appl. No. 12/280,969, filed Aug. 27, 2008.
U.S. Appl. No. 12/280,970, filed Aug. 27, 2008.
U.S. Appl. No. 60/778,008, filed Feb. 28, 2006.
U.S. Appl. No. 60/790,626, filed Apr. 10, 2006.
Vargiya, R. and Chan, P., "Boundary Detection in Tokenizing Network Application Payload for Anomaly Detection,", Technical Report CS-2003-21, Department of Computer Sciences, Florida Institute of Technology, 2003.
Wagner, D. and Soto, P., "Mimicry Attacks on Host-Based Intrusion Detection Systems", In Proceedings of the ACM Conference on Computer and Communications Security (CCS), Nov. 18-22, 2002, Washington, DC, USA.
Wagner, D. and Dean, D., "Intrusion Detection via Static Analysis", Proceedings of the IEEE Symposium on Security and Privacy, 2001, pp. 156-169.
Wang, H.J., et al. "Shield: Vulnerability-Driven Network Filters for Preventing Known Vulnerability Exploits", In Proceedings of the 2004 Conference on Applications, Technologies, Architectures, and Protocols for Computer Communications (SIGCOMM '04), Aug. 2004, pp. 193-204.
Wang, K. and Stolfo, S.J., "Anomalous Payload-Based Network Intrusion Detection", In Proceedings of the 7th International Symposium on Recent Advances in Intrusion Detection (RAID), Sep. 2004, pp. 203-222.
Wang, K., et al., "Anagram: A Content Anomaly Detector Resistant to Mimicry Attack", Proc. Int. Conf. on Recent Advanced in Intrusion Detection, RAID '06, Sep. 2006 (CU Tech Report 020-06).
Wang, K., et al., "Anomalous Payload-Based Worm Detection and Signature Generation", In Proceedings of the 8th International Symposium on Recent Advances in Intrusion Detection (RAID), pp. 227-246, Sep. 2005.
Wang, X., et al., "SigFree: A Signature-free Buffer Overflow Attack Blocker", In Proceedings of the 15th USENIX Security Symposium, 2006, pp. 225-240.
Willems, C., et al., "Toward Automated Dynamic Malware Analysis Using CWSandbox", In IEEE Security & Privacy, vol. 5, No. 2, Mar.-Apr. 2007, pp. 32-39.
Written Opinion in International Patent Application No. PCT/US2007/05406, filed Feb, 28, 2007, mailed Mar. 31, 2008.
Written Opinion in International Patent Application No. PCT/US2007/05408, filed Feb. 28, 2007, mailed Mar. 6, 2008.
Written Opinion in International Patent Application No. PCT/US2009/056623, filed Sep. 11, 2009, mailed Apr. 22, 2010.
Eskin, E., "Sparse Sequence Modeling with Applications to Computational Biology and Intrusion Detection", Dissertation, Columbia University, Apr. 2002, pp. 1-147.
Natvig, K., "SandboxII: Internet", In Proceedings of the Virus Bulletin Conference, New Orleans, LA, US, Sep. 26-27, 2002, pp. 1-18.
Notice of Allowance dated Oct. 15, 2012 in U.S. Appl. No. 12/280,969.
U.S. Appl. No. 60/855,703, filed Oct. 30, 2006.

\* cited by examiner

| 210 | | |
|---|---|---|
| _VBA_PROJECT | Data | Modulo1 | Pictures |
| 0Table | Equation Native | MyMap | PRINT |
| 1Table | Events | NewMacros | PROJECT |
| AttachContents | GeneralMacroStream | ObjInfo | PSMclustertable |
| AttachDesc | Header | OCXNAME | SummaryInformation |
| AttachPres | Image Contents | Ole | ThisDocument |
| autoOpen | Internal | Ole10ItemName | ThisWorkbook |
| CDraw | Macros | Ole10Native | VisioDocument |
| CompObj | MailAttachment | OlePres000 | VisioInformation |
| CONTENTS | MailEnvelope | Payload | WordDocument |
| Contents | MailStream | PIC | WordProData |
| CorelDRAW | META | PICT | Workbook |

FIG. 2

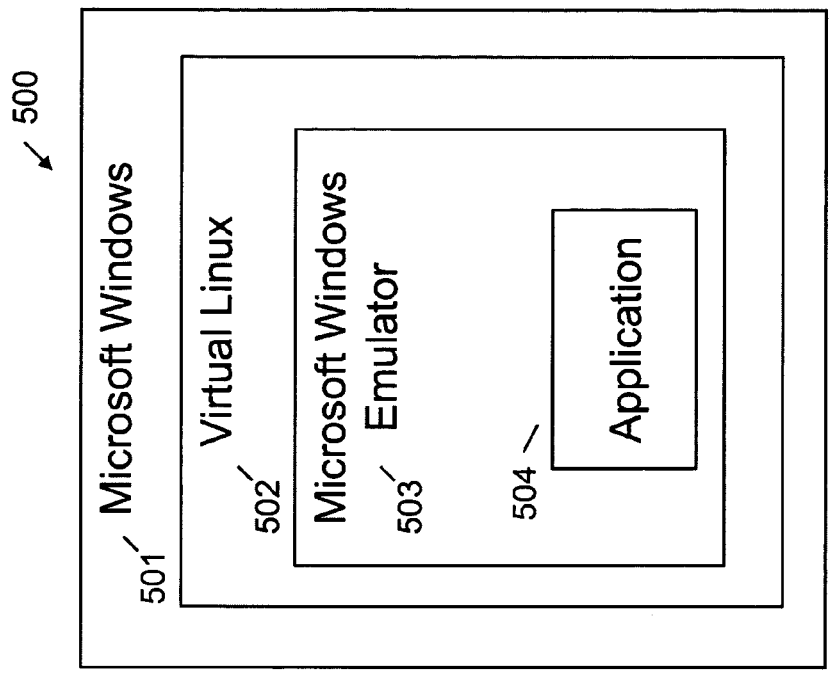
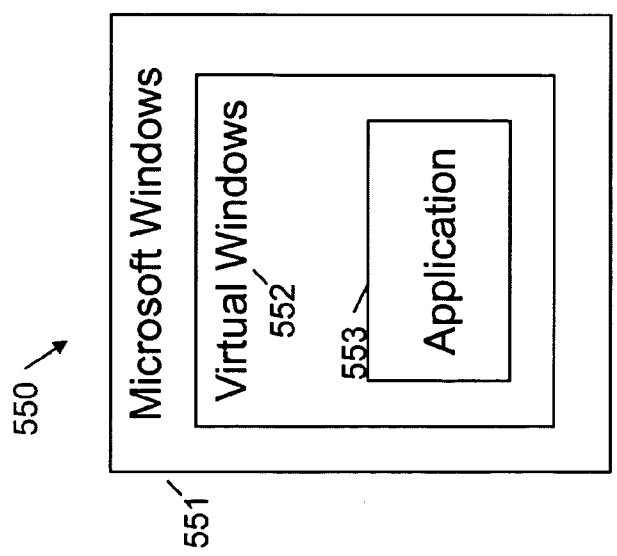
FIG. 5

%7Eanhabib%2F104.doc - Microsoft Word

File Edit View Insert Format Tools Table Window Help

Heading 1 | Times New Roman | 12 | B

Traditions and Cultures 104- Lecture 851
Winter 2000/2001

Justice and Virtue

Description

This course will introduce you to some of the ce and political philosophy through the works of some of t western tradition. We will discuss The Republic by Plat Niccolo Machiavelli (1469-1527), Leviathan by Thomas Second Treatise on Civil Government and A Letter Con (1632-1704), The Social Contract and A Discourse on t Inequality of Mankind by Jean-Jacques Rousseau(1712 Contract by David Hume (1711-1776).

There are three aims of this course. The first aim philosophical perspectives on moral and political topics

2410

2415

%7Eanhabib%2F104.doc - Microsoft Word

File Edit View Insert Format Tools Table Window Help

Heading 1 | Vjngu!Okv"Tqncp | 12 | B

Traditions and Cultures 104- Lec
Winter 2000/2001

Justice and V

Description

This course will introduce Y questions and ideas in moral and through the works of some of the the western tradition. We will d (427 – 347 BCE), The Prince by N 1527), Leviathan by Thomas Hobbe Treatise on Civil Government and Toleration by John Locke (1632-1 and A Discourse on the Origin an of Mankind by Jean-Jacques Rouss

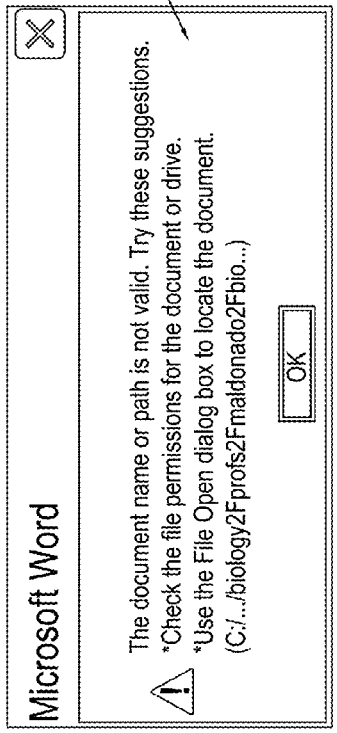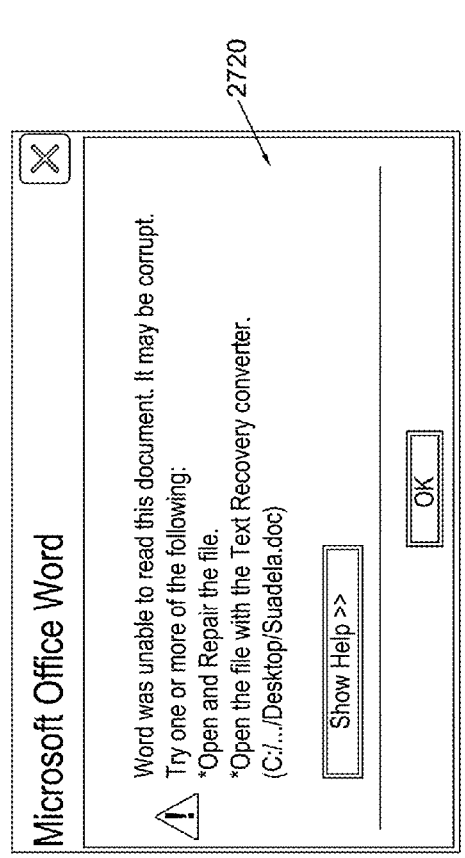
FIG. 27

US 8,789,172 B2

METHODS, MEDIA, AND SYSTEMS FOR DETECTING ATTACK ON A DIGITAL PROCESSING DEVICE

CROSS REFERENCE TO RELATED APPLICATION

This application is a continuation-in-part of International Application No. PCT/US2007/078773, filed Sep. 18, 2007, which claims the benefit of U.S. Provisional Patent Application No. 60/845,563, filed Sep. 18, 2006, which are hereby incorporated by reference herein in their entireties. This application also claims the benefit of U.S. Provisional Application No. 61/096,795, filed Sep. 13, 2008, which is hereby incorporated by reference herein in its entirety.

STATEMENT REGARDING FEDERALLY SPONSORED RESEARCH OR DEVELOPMENT

The invention was made with government support under Grant No. DE-AC05-76RL01830 awarded by Department of Energy (DOE), Grant No. 60NANB1D0127 awarded by the U.S. Department of Homeland Security through the Institute for Information Infrastructure Protection (I3P), and Grant No. W911NF-06-1-0151-49626-CI awarded by the Army Research Office (ARO). The government has certain rights in the invention.

TECHNICAL FIELD

The disclosed subject matter relates to methods, media, and systems for detecting attack on a digital processing device.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Documents created and executed by various applications, including, for example, document rendering applications such as Microsoft® Word® and Adobe® Acrobat® include not only simple binary content interpreted by the document rendering applications, but also can include, as part of the documents themselves, software necessary to interpret data in the documents. Because of their ability to contain and execute software, such documents can be considered complex code injection platforms. The injected code can be of various types, such as, for example, Macros (e.g., scripts written in Microsoft® Visual Basic®) and Javascript® (e.g., embedded in Adobe PDF® files).

While the ability to embed software into documents provides various advantages to users, it can also be used by attackers to launch attacks on digital data processing devices. In some cases, malicious code may attack upon execution. In other cases, embedded malicious code can lie dormant for use in a future multi-partite attack. For example, one type of attack embeds malicious code in the padding areas of the binary file format of documents or to replace normal textual data with malicious code.

One issue in inhibiting such attacks is that it can be difficult for a user or a system to determine whether code embedded in a document is, for example, useful and friendly or harmful and malicious. For example, software can be injected into a document as obfuscated encoded code (e.g., code represented as image data that, when decoded and rendered at runtime, can be executed to perform malicious activities). In some cases, attackers may even entice a user to launch embedded malicious code. For example, as illustrated in FIG. 20, embedded malicious object 2010 has the message "CLICK HERE" displayed below it. If the user follows these instructions, the user will have launched an attack on the user's own system. In some cases, a parsed document in the Object Linking and Embedding (OLE) structured storage format, which contains nodes and directories, can harbor various exploits, such as buffer overflows or vulnerabilities to other applications. For example, FIG. 22 illustrates an example of the internal structure of a parsed document in OLE format, where attackers may craft data that exploit the vulnerabilities which redirect the execution of Microsoft® Word® to a particular location to execute arbitrary embedded malicious code, such as in the "1Table" sector.

In some cases, attackers may obfuscate or shape the attacking code so that it appears to be the same as, for example, benign code surrounding it. Code, including benign code, tends to have a high entropy statistical distribution, so, some attackers, for example, may inject malicious code into benign code in an attempt to avoid detection. FIG. 21 illustrates an uninfected Microsoft® Word® document 2111 and the same document 2112 embedded with a known malicious code sample (in this case, the malicious code is known as "Stammer"). A Symantec® anti-virus scanner has been installed and is running on this system, however, it does not detect the embedded malicious code even though Slammer is a known attacker. In addition, there is no discernable change to the appearance of the document that may, for example, make a user suspicious that malicious code is present.

Generally speaking, embedding malicious code within documents is a convenient approach to attack a digital processing device. Such attacks can be targeted and difficult to stop due to the number of document-exchange vectors and particular vulnerabilities in word processing programs. Moreover, detecting malicious code embedded in a document is increasingly difficult due to the complexity of modern document formats.

Accordingly, it is desirable to provide methods, media, and systems that overcome these and other deficiencies of the prior art.

SUMMARY

Methods, media, and systems for detecting attack are provided. In some embodiments, methods for detecting are provided. The methods include comparing at least part of a document to a static detection model; determining whether attacking code is included in the document based on the comparison of the document to the static detection model; executing at least part of the document; determining whether attacking code is included in the document based on the execution of the at least part of the document; and if attacking code is determined to be included in the document based on at least one of the comparison of the document to the static detection model and the execution of the at least part of the document, reporting the presence of an attack.

In some embodiments, computer-readable media containing computer-executable instructions that, when executed by a processor, cause the processor to perform methods for detecting an attack on an application are provided. The methods include comparing at least part of a document to a static detection model; determining whether attacking code is included in the document based on the comparison of the document to the static detection model; executing at least part of the document; determining whether attacking code is included in the document based on the execution of the at least part of the document; and if attacking code is determined to be included in the document based on at least one of the comparison of the document to the static detection model and the execution of the at least part of the document, reporting the presence of an attack.

In some embodiments, systems for detecting attack including, an interface in communication with a network; a memory; and a processor in communication with the memory and the interface are provided, wherein the processor: compares at least part of a document to a static detection model; determines whether attacking code is included in the document based on the comparison of the document to the static detection model; executes at least part of the document; determines whether attacking code is included in the document based on the execution of the at least part of the document; and if attacking code is determined to be included in the document based on at least one of the comparison of the document to the static detection model and the execution of the at least part of the document, reports the presence of an attack.

In some embodiments, methods for detecting are provided. The methods include executing at least part of a document, wherein a load order of shared objects is controlled; detecting for an indication of a crash; and reporting the presence of an attack, based on the detection for an indication of a crash.

In some embodiments, methods for detecting are provided. The methods include receiving a first document in a first format; converting the document to a second format to create a second document; converting the second document to the first format to create a third document; comparing the first document to the third document; determining whether attacking code is included in the first document based on the comparison; and if attacking code is determined to be included, reporting the presence of an attack.

In some embodiments, methods for detecting malicious code in electronic documents are provided, the methods include: selecting a data segment in at least one portion of an electronic document; determining whether the arbitrarily selected data segment can be altered without causing the electronic document to result in an error when processed by a corresponding program; in response to determining that the arbitrarily selected data segment can be altered, arbitrarily altering the data segment in the at least one portion of the electronic document to produce an altered electronic document; and determining whether the corresponding program produces an error state when the altered electronic document is processed by the corresponding program.

In some of these methods, the electronic document is a word processing document. In some of these methods, the corresponding program is a word processor. In some of these methods, the at least one portion of the electronic documents is altered by changing the values of data in the at least one portion by a given value or by changing the values of data in the at least one portion by an arbitrarily selected displacement.

In some embodiments, systems for detecting malicious code in electronic documents are provided, the systems comprising: at least one digital processing device that: selects a data segment in at least one portion of an electronic document; determines whether the arbitrarily selected data segment can be altered without causing the electronic document to result in an error when processed by a corresponding program; in response to determining that the arbitrarily selected data segment can be altered, arbitrarily alters the data segment in the at least one portion of the electronic document to produce an altered electronic document; and determines whether the corresponding program produces an error state when the altered electronic document is processed by the corresponding program.

In some of these systems, the electronic document is a word processing document. In some of these systems, the corresponding program is a word processor. In some of these systems, the at least one portion of the electronic documents is altered by changing the values of data in the at least one portion by a given value or by changing the values of data in the at least one portion by an arbitrarily selected displacement.

In some embodiments, computer-readable media containing computer-executable instructions that, when executed by a processor, cause the processor to perform a method for detecting malicious code in electronic documents, are provided, the method comprising: selecting a data segment in at least one portion of an electronic document; determining whether the arbitrarily selected data segment can be altered without causing the electronic document to result in an error when processed by a corresponding program; in response to determining that the arbitrarily selected data segment can be altered, arbitrarily altering the data segment in the at least one portion of the electronic document to produce an altered electronic document; and determining whether the corresponding program produces an error state when the altered electronic document is processed by the corresponding program.

In some of these media, the electronic document is a word processing document. In some of these media, the corresponding program is a word processor. In some of these media, the at least one portion of the electronic documents is altered by changing the values of data in the at least one portion by a given value or by changing the values of data in the at least one portion by an arbitrarily selected displacement.

BRIEF DESCRIPTION OF THE DRAWINGS

FIG. 2 is table listing sections that a Microsoft® Word® document can be parsed into in accordance with some embodiments of the disclosed subject matter.

FIG. 5 is an illustration of two environments in accordance with some embodiments of the disclosed subject matter.

FIG. 24 is an illustration of a screenshot of two documents before and after applying the arbitrary data transformation mechanism in accordance with some embodiments of the disclosed subject matter.

FIGS. 25 and 26 are illustrations showing examples of the detection of malicious code embedded in electronic documents in accordance with some embodiments of the disclosed subject matter.

FIG. 27 is an illustration showing examples of messages indicating that the document may be damaged in accordance with some embodiments of the disclosed subject matter.

DETAILED DESCRIPTION

Figure 1:
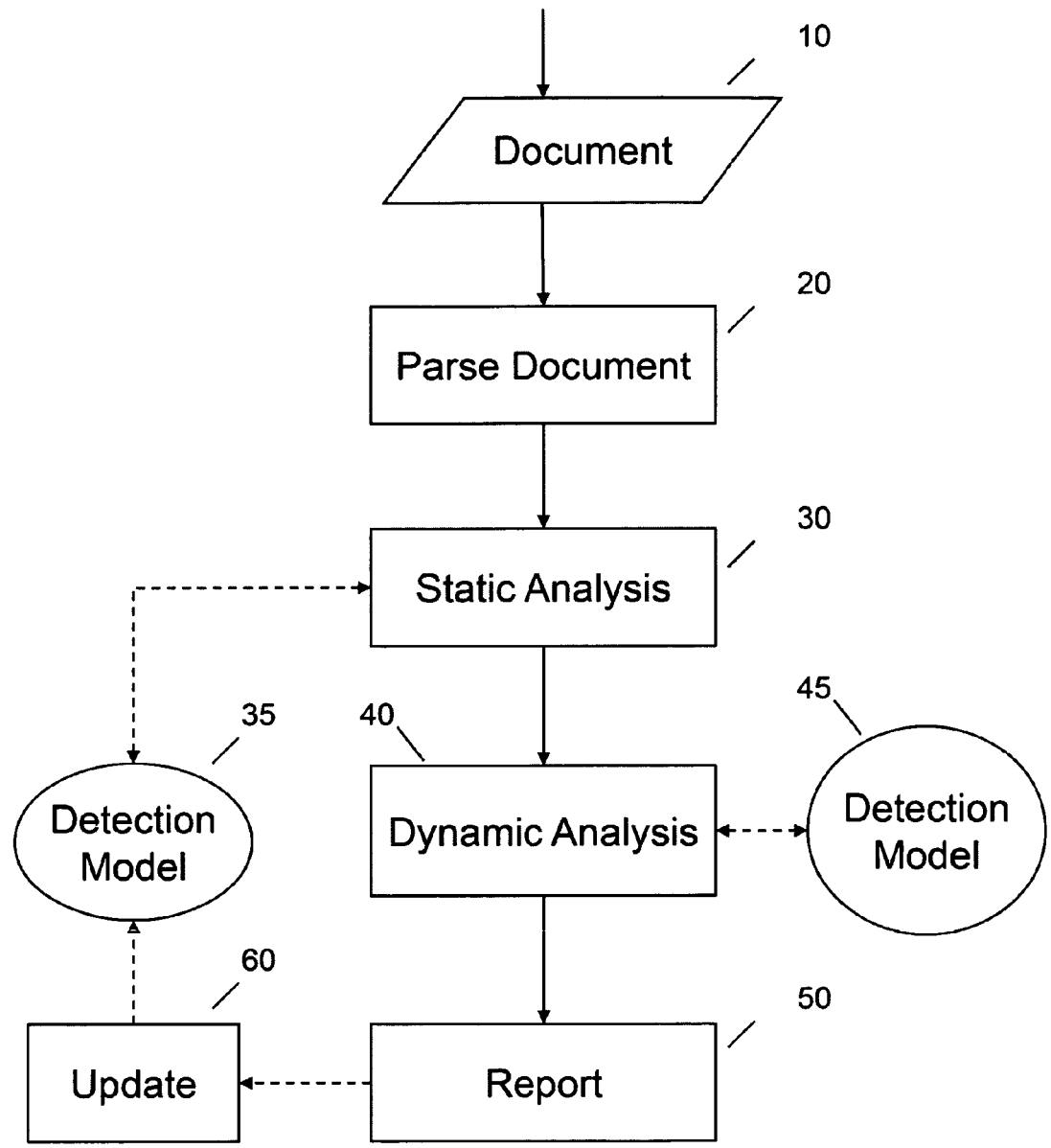
FIG. 1 is a simplified illustration of a method for detecting attack on a digital processing device in accordance with some embodiments of the disclosed subject matter.

Methods, systems, and media for detecting and/or inhibiting attack on a digital processing device are provided. In some embodiments, the methods, systems, and media of the disclosed subject matter can detect attack by comparing received documents to models created by analyzing known benign and malicious applications and/or by executing received documents and comparing the behavior of the execution to models of behavior of execution of known benign and/or malicious applications. For example, as illustrated in FIG. 1, in some embodiments, a document 10 can be received at, for example, a digital processing device connected to a network. Document 10 can be of various file types and can include, for example, embedded code. Document 10 can be parsed, at 20, into various sections. In some embodiments, static analysis can be performed, at 30, on document 10 and/or sections of documents 10, to determine whether malicious code is detected within document 10. In performing static analysis, at 30, document 10 and/or sections of document 10 can be compared to a detection model 35 of, for example, known malicious and/or known benign code. Dynamic analysis can be performed, at 40, on document 10 and/or sections of document 10 to determine whether malicious code is detected within document 10. In performing dynamic analysis, at 40, behavior exhibited by execution of document 10 and/or sections of document 10 can be compared to a detection model 45 of, for example, the behavior of known malicious and/or known benign code. The presence or absence of malicious code in document 10 can be responded to, at 50, by, for example, reporting the presence of malicious code to a user and/or a system administrator, cleaning document 10 of the detected malicious code, and/or deleting and/or quarantining document 10. In some embodiments, if malicious code is detected by, for example, dynamic analysis, at 40, but not by static analysis, at 30, detection model 35 can be updated, at 60, so that, for example, the same or similar malicious code detected, at 40, can be detected, at 30, if seen again. Document 10 can include documents and/or embedded objects of various formats, such as, for example, Microsoft® Word® formats, Microsoft® Excel® formats, Microsoft® Power Point® formats, Adobe® Portable Document Format, PostScript, Corel® WordPerfect® formats, Joint Photographic Experts Group (JPG), Tagged Image File Format (TIFF), Moving Picture Experts Group (MPEG) (e.g., MP3, MP4, etc.), and/or Resource Interchange File Format (RIFF), etc.

In some embodiments, document 10 may not be parsed at 20, and instead, for example, static analysis, at 30, and/or dynamic analysis, at 40, can be performed directly on document 10. However, in some embodiments, static analysis, at 30, and/or dynamic analysis, at 40, can be performed on sections of document 10. In such embodiments, document 10 can be parsed, at 20, into various sections. The sections can include, for example, embedded objects, tables, images, plain text, injected code, etc. Various parsing systems and/or methods can be used, at 20, to parse a document 10 of various formats into various sections. For example, Apache® POI, available at http://poi.apache.org/, can be used to parse Microsoft® Word® documents into their constituent structures. These structures can be referenced by, for example, structure reference names using Object Linking and Embedding (OLE). As listed in table 210 of FIG. 2, the parsed sections of a Microsoft® Word® document can include various sections. Sections can be arbitrarily named and can be defined by an author of a document. In addition, some sections (e.g., sections 211) can be included by default in a Microsoft® Word® Document. For example, referring to default sections 211 of table 210 of FIG. 2, VBA_PROJECT identifies a Visual Basic Application, Data identifies binary data, 0Table and 1Table identify tabular structures, PROJECT can identify a macro and/or a Visual Basic project, SummaryInformation identifies summary information of a document, and WordDocument identifies the text portion of a document.

Figure 3:
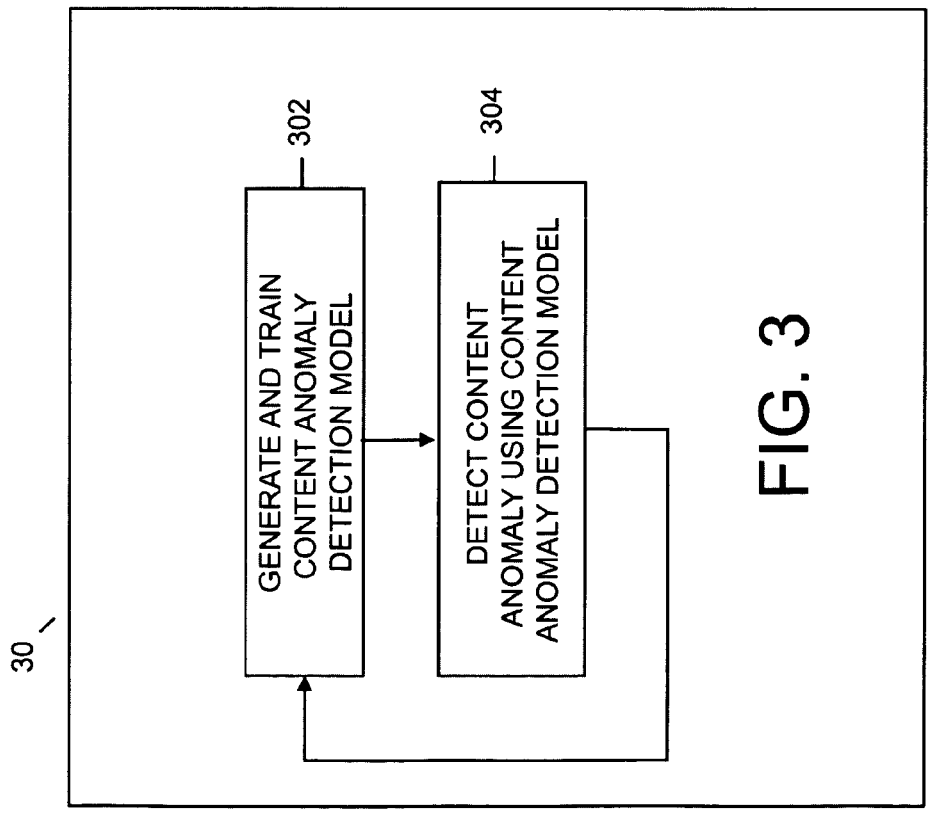
FIG. 3 is a simplified illustration of a method for detecting content anomalies in accordance with some embodiments of the disclosed subject matter.

Various systems and methods can be used to perform static analysis, at 30 of FIG. 1, such as, for example, Mahalanobis distance calculation, n-gram analysis, n-perm analysis, and/or common n-gram analysis. For example, FIG. 3 is a simplified illustration of a method for detecting content anomalies that can be performed, at 30 of FIG. 1. As shown, at 302, a content anomaly detection model can be generated and trained. In some embodiments, this model can be part of, or all of, model 35 of FIG. 1. At 304, the content anomaly detection model can be used to detect anomalies. Various embodiments of the method of FIG. 3 are described in, for example, International Publication No. WO 2007/100916, entitled "Systems, Methods, and Media for Outputting a Dataset based upon Anomaly Detection," which is hereby incorporated by reference herein in its entirety.

Figure 4:
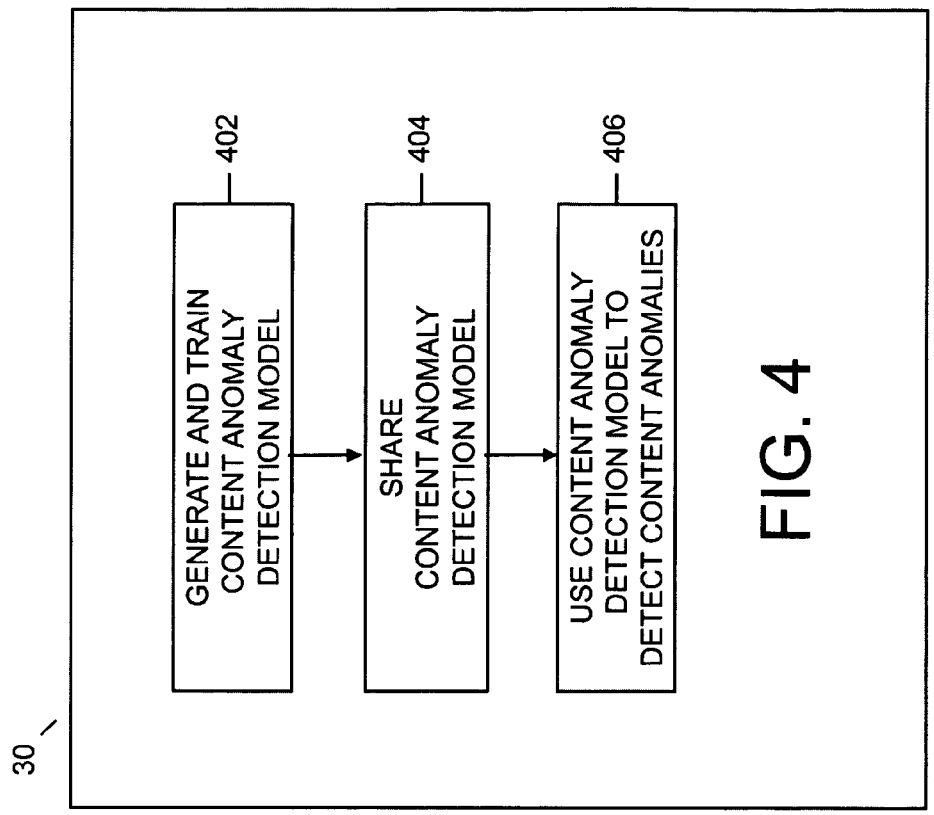
FIG. 4 is a simplified illustration of a method for generating, training, and sharing a binary-based content anomaly detection model and for using the content anomaly model to detect content anomalies in accordance with some embodiments of the disclosed subject matter.

Other methods which can be performed at 30 of FIG. 1 include, for example, methods for generating, training, and sharing a binary-based content anomaly model and for using the content anomaly model to detect content anomalies, as illustrated in, for example, FIG. 4. As shown, at 402, a binary-based content anomaly detection model is generated and trained. In some embodiments, this model can be part of or all of model 35 of FIG. 1. In some embodiments, a binary-based content anomaly model can be generated and trained using known benign training datasets. In some embodiments, a binary-based content anomaly model can be generated and trained using known anomaly signatures. In some embodiments, a binary-based anomaly detection model can be trained in cooperation with a host-based detector. At 404, the binary-based content anomaly detection is shared. A shared model can be received from one or more remote sites to compare with and update a local model (e.g., model 35). At 406, the binary based content anomaly detection model is used to detect content anomalies. For example, an anomaly score of an input dataset can be used to determine whether the input dataset is anomalous. Various embodiments of the method of FIG. 4 are described in, for example, International Publication No. WO 2007/100915, entitled "Systems, Methods, and Media for Outputting Data based on Anomaly Detection," which is hereby incorporated by reference herein in its entirety. Other examples of systems and methods that can be used to detect attack, for example, at 30 of FIG. 1, are described in, for example, International Publication No. WO 2005/047862, entitled "Apparatus Method and Medium for Identifying Files using N-gram Distribution of Data," which is hereby incorporated by reference herein in its entirety.

FIG. 5 illustrates two environments which can be used in accordance with some embodiments of dynamic analysis, at 40, of FIG. 1. Environment 500 illustrates an emulated environment and can run, for example, Microsoft® Windows® 501 on a digital processing device. A virtual machine, such as, for example, VMware WorkStation can be installed and Linux® 502 can be installed and run in it. A Microsoft® Windows® binary translator and emulator 503, such as, for example, CrossOver® Office Standard 5.0.1 can be installed in Linux® 502. An application 504, such as, for example, Microsoft® Word®, can be run inside emulator 503 and used to open and/or execute a document 10. Environment 550 illustrates and non-emulated environment and can run, for example, Microsoft® Windows® 551 on a digital processing device. Though environment 550 is considered non-emulated, in some embodiments, a virtual machine, acting as a sandbox to protect the underlying system, can be used to run an instance of Microsoft® Windows® 552 inside Microsoft® Windows® 551. Inside Microsoft® Windows® 551, an application 553, can be executed. In some embodiments, application 504 and application 553 can be the same application with the same set up. For example, both application 504 and application 553 can be Microsoft® Office Word 2007® with the same updates (e.g., service packs, security updates, bug fixes, etc.).

Figure 6:
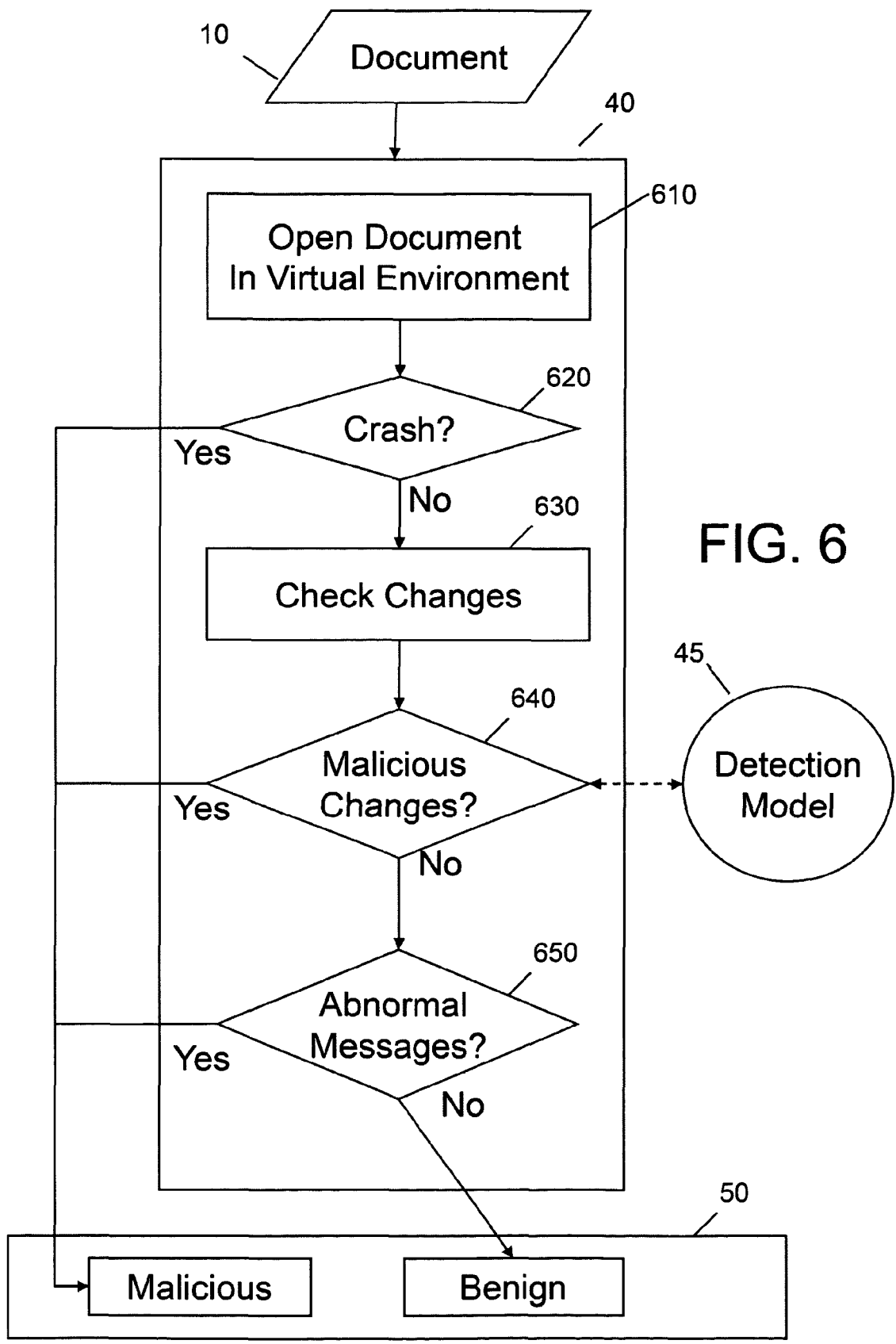
FIG. 6 is a simplified illustration of a method for detecting attack on a digital processing device in accordance with some embodiments of the disclosed subject matter.

Some embodiments can manipulate the order in which shared libraries are loaded by, for example, application 504 and/or 553. Various applications in various systems employ shared libraries that can include various shared code and/or data. In some systems, the order in which some shared libraries are loaded to memory typically does not cause benign code to crash. However, attacks launched by malicious code can be designed with a particular shared library load order in mind and changing the order can cause a malicious application and/or the application and/or operating system running it, to crash. Some embodiments can use an emulated environment, such as, for example, environment 500, to reveal code exceptions which depend on the order in which shared objects are loaded to memory by changing the order in which shared objects would normally be loaded. For example, Microsoft® Windows® implements shared objects as DLLs (Dynamic-link libraries) and changing the load order of DLLs can cause some malicious programs to crash or to cause, for example, the application and/or operating system executing them to crash. As illustrated in FIG. 6, in some embodiments, as part of dynamic analysis, at 40 of FIG. 1, a document 10 can be opened, at 610, in environment 500, with the load order of DLLs altered, and it can be determined, at 620, whether a system crash has occurred. If a crash has occurred, the document can be reported, at 50, as including malicious code.

Figure 7:
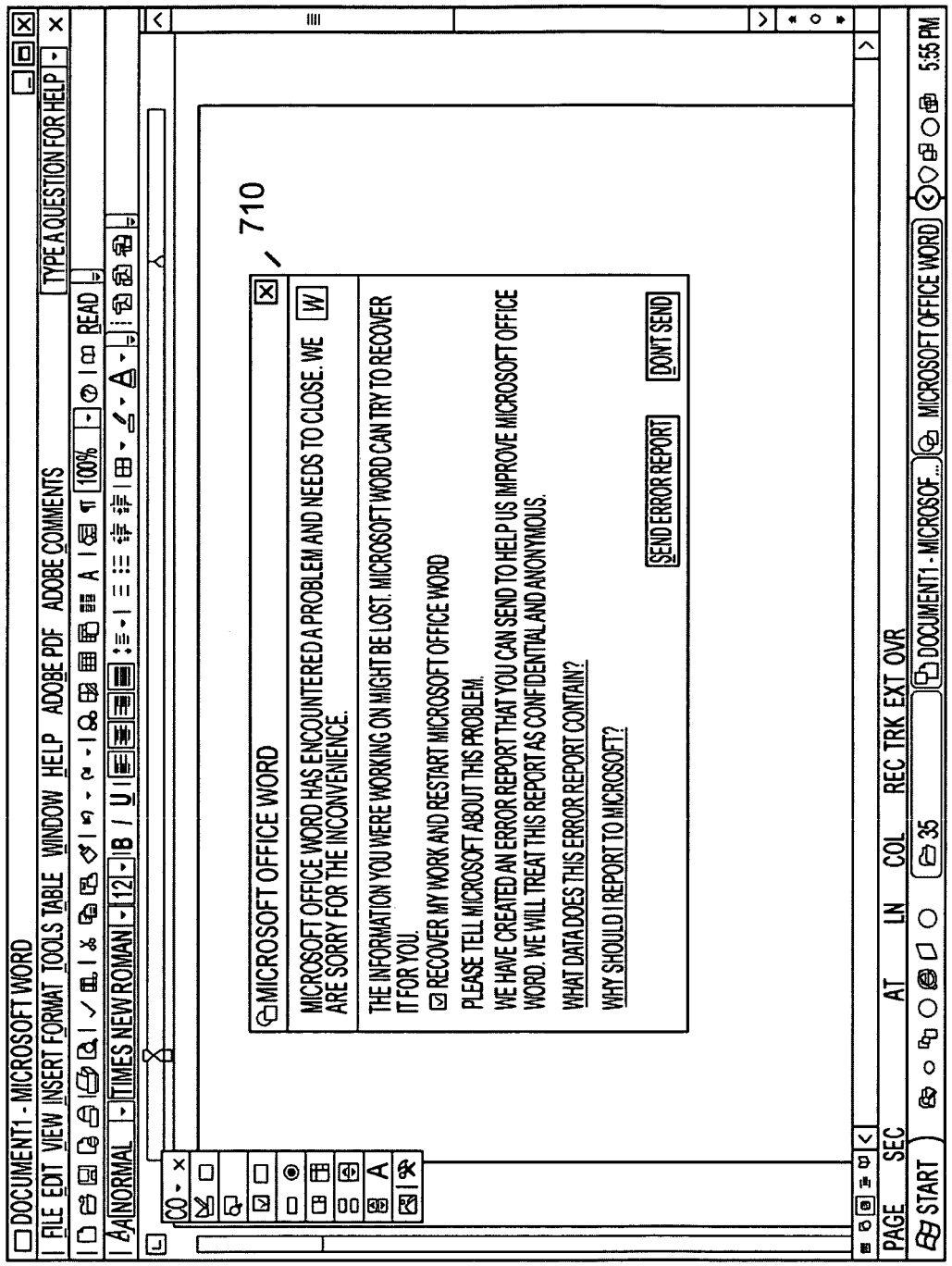
FIG. 7 is an illustration of a screenshot of a message indicating an application has crashed that can be used to detect attack in accordance with some embodiments of the disclosed subject matter.
Figure 8:
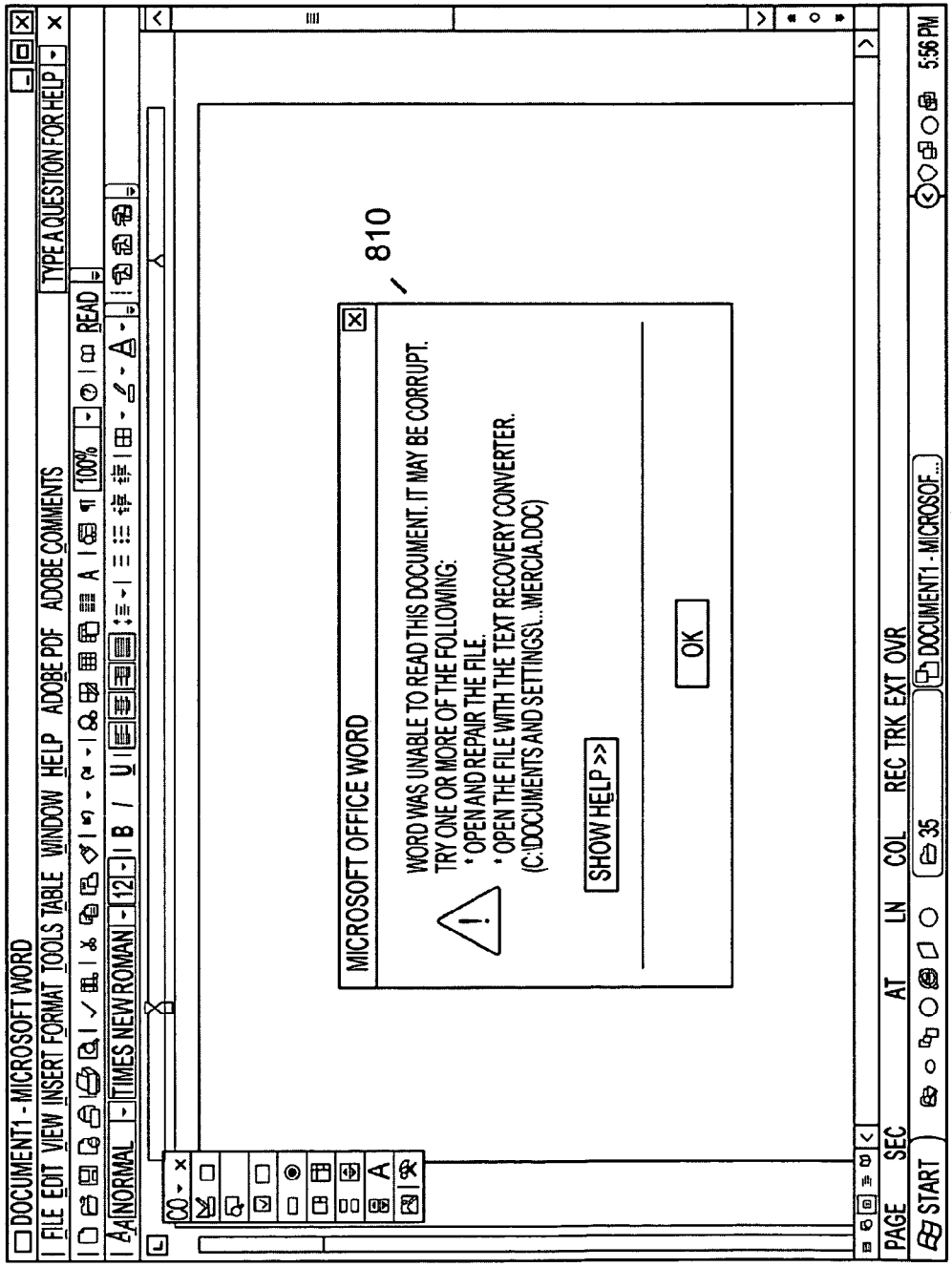
FIG. 8 is an illustration of a screenshot of a message that can be interpreted as indicating an application has crashed in accordance with some embodiments of the disclosed subject matter.

In some embodiments, the determination of whether an application crashes, at 620, can be detected and/or reported by the application and/or the operating system. For example, FIG. 7 illustrates a user being informed by pop-up window 710 that Microsoft® Word® has crashed. Crashes can include, for example, entering an infinite loop, an unexpected termination of the application, and/or the inability to open document 10. Another example of behavior that can be considered a crash, at 620, is the presence of pop-up window 810 of FIG. 8, which alerts a user that an application was not able to read a document 10. In some embodiments, in addition to, or instead of, monitoring messages from an application or operating system of detection of a crash, an application and/or operating system can be monitored directly, for example, by monitoring the status and/or presence of one or more process identifiers.

If a crash is not detected at 620, it can be determined, at 630 and 640, whether executing document 10 results in unexpected behavior. In some embodiments, detecting unexpected behavior can include, for example, comparing the behavior observed when executing a document 10 in a first environment to behavior seen when executing known benign and/or malicious documents in the first environment. In some embodiments, detecting unexpected behavior can include executing a document 10 in various environments and comparing the differences in behavior observed when executing a document 10 in various environments to behavior seen when executing known benign and/or malicious various environments. For example, differences between the files generated and/or altered and/or differences between various events posted by an application opening document 10. The various environments can include, for example, environment 500 of FIG. 5 and environment 550 of FIG. 5. In some embodiments, malicious behavior resulting from executing a document 10 can be detected by comparing behavior observed when opening document 10 to a model 45, which can include, for example, a list or lists of expected and/or unexpected behavior and/or a list or lists of expected and/or unexpected differences in behavior among execution in various environments.

Figure 5A:
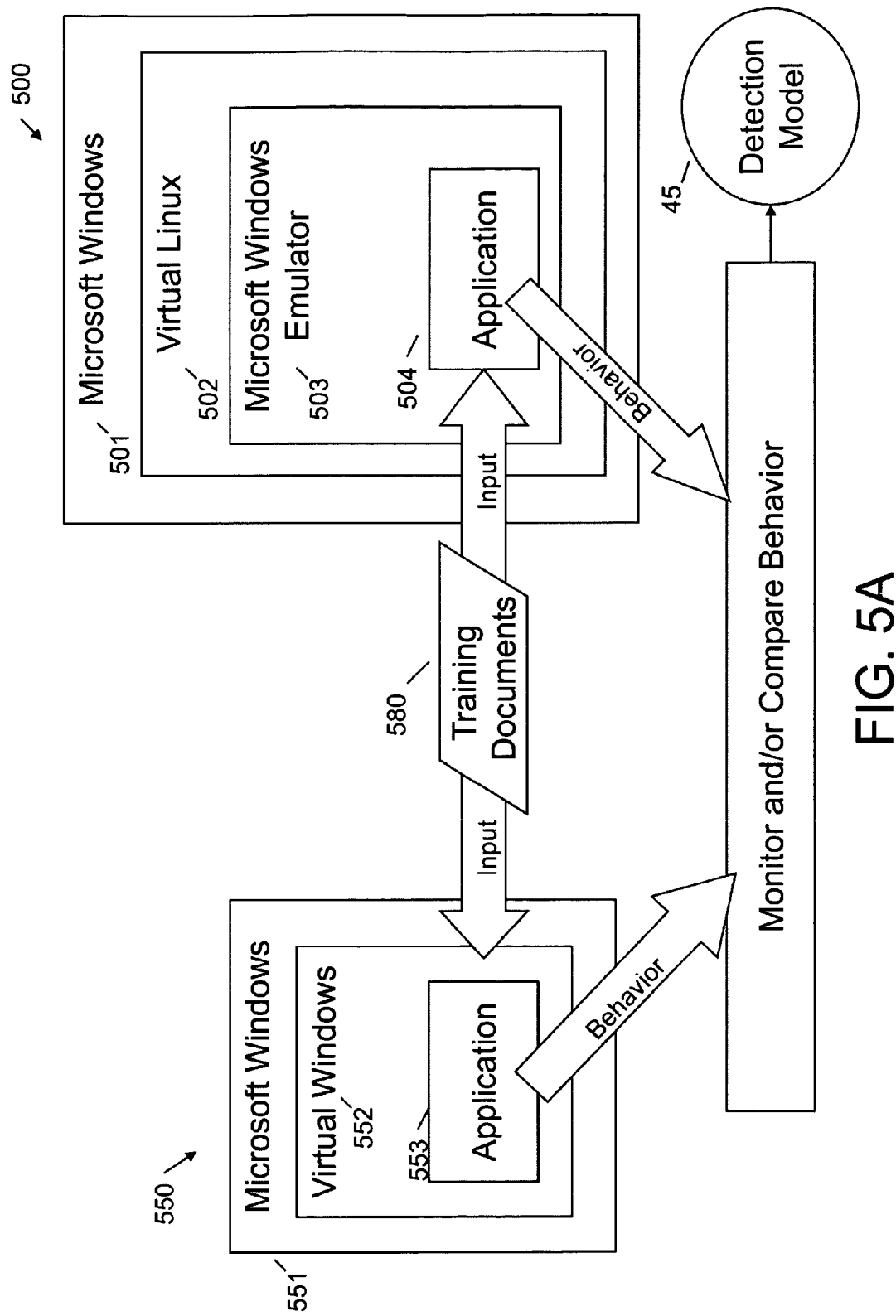
FIG. 5A is a schematic diagram of a system suitable for generating at least part of a dynamic detection model using the environments illustrated in FIG. 5 in accordance with some embodiments of the disclosed subject matter.
Figure 9:
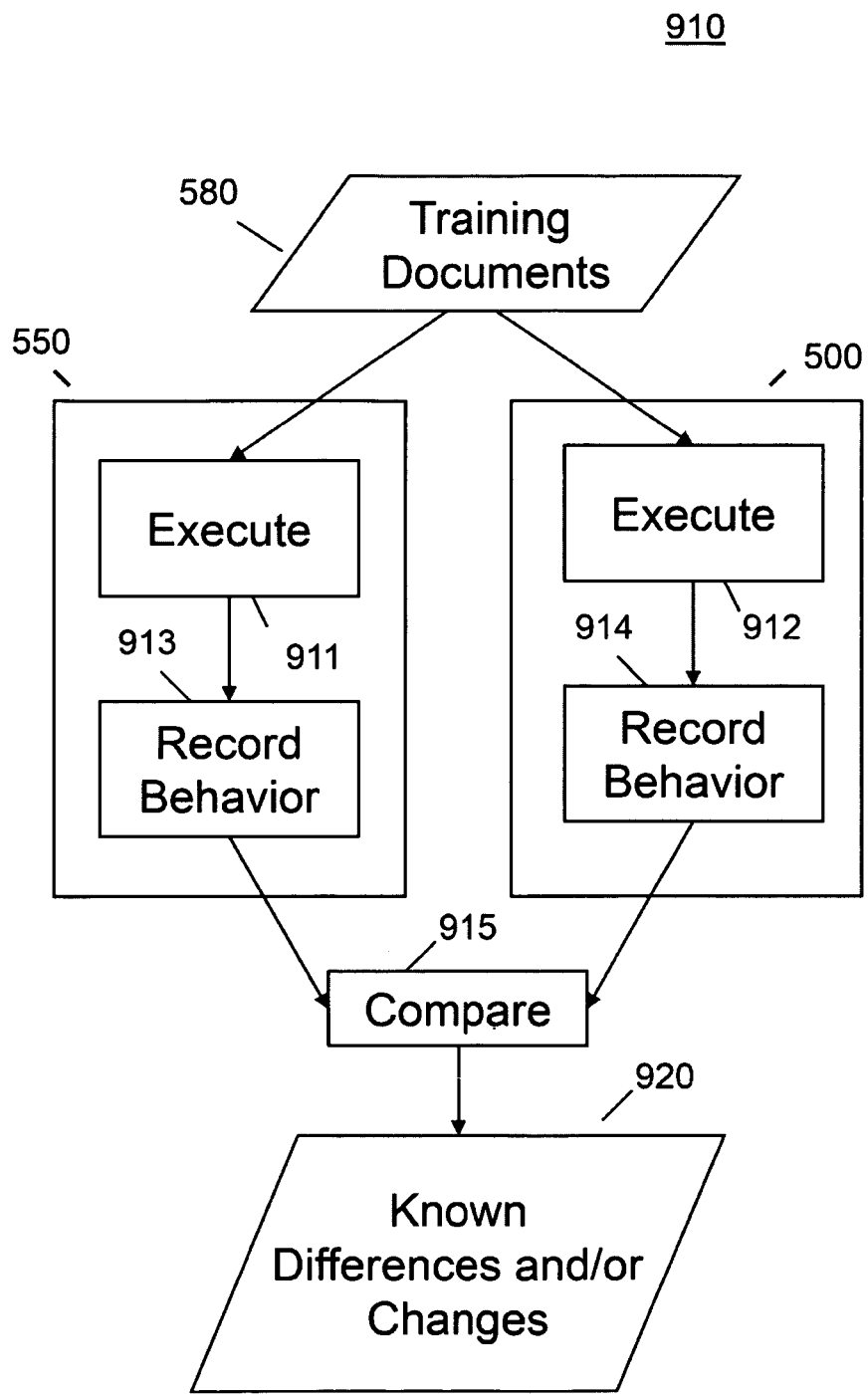
FIG. 9 is a simplified illustration of a method for generating at least part of a dynamic detection model in accordance with some embodiments of the disclosed subject matter.

To generate a model 45 of expected and/or unexpected behavior and/or expected and/or unexpected differences in behavior, benign and malicious documents can be executed and changes to the systems in which they are executed can be monitored and recorded. FIG. 5A illustrates a system that can be used to generate a model 45. For example, method 910 of FIG. 9 can be performed on the system of FIG. 5A. In some embodiments, training document 580 can be a set of benign documents and/or sections of benign documents and can be opened and/or executed, at 911, in environment 550. The same set of benign documents 580 and/or sections of benign documents 580 can be opened and/or executed, at 912, in environment 500. The behavior observed by execution, at 911 and 912, can be recorded to create records 913 and 914. Records 913 and 914 can be compared, at 915, and the differences can be recorded and considered a record of expected differences 920. Record 920 can be saved as part of model 45.

To identify unexpected differences that indicate malicious code, some embodiments can execute a collection of malicious documents. For example, training documents 580 can include known malicious documents and/or sections of malicious documents (possibly including malicious documents and/or sections of documents identified using static analysis, at 30, of FIG. 1). From these differences, for example, known differences 920 can include a list of unexpected differences (e.g., malicious changes) and be included as part of model 45. In some embodiments, expected differences can be used to avoid false positives and unexpected differences can be used to improve malicious code detection. Changes which occur both when executing a document in both environment 550 and environment 500 can still be included in model 45 if, for example, they provide an indication of malicious behavior. For example, if a malicious application exhibits the same behavior regardless of its environment, but this behavior is different than the behavior of a benign application, it can be included in model 45.

Returning to FIG. 6, at 640, model 45 can be compared to changes observed, at 630, considering document 10. If the changes are considered to be malicious, document 10 can be reported, at 50, as including malicious code.

Figure 10A:
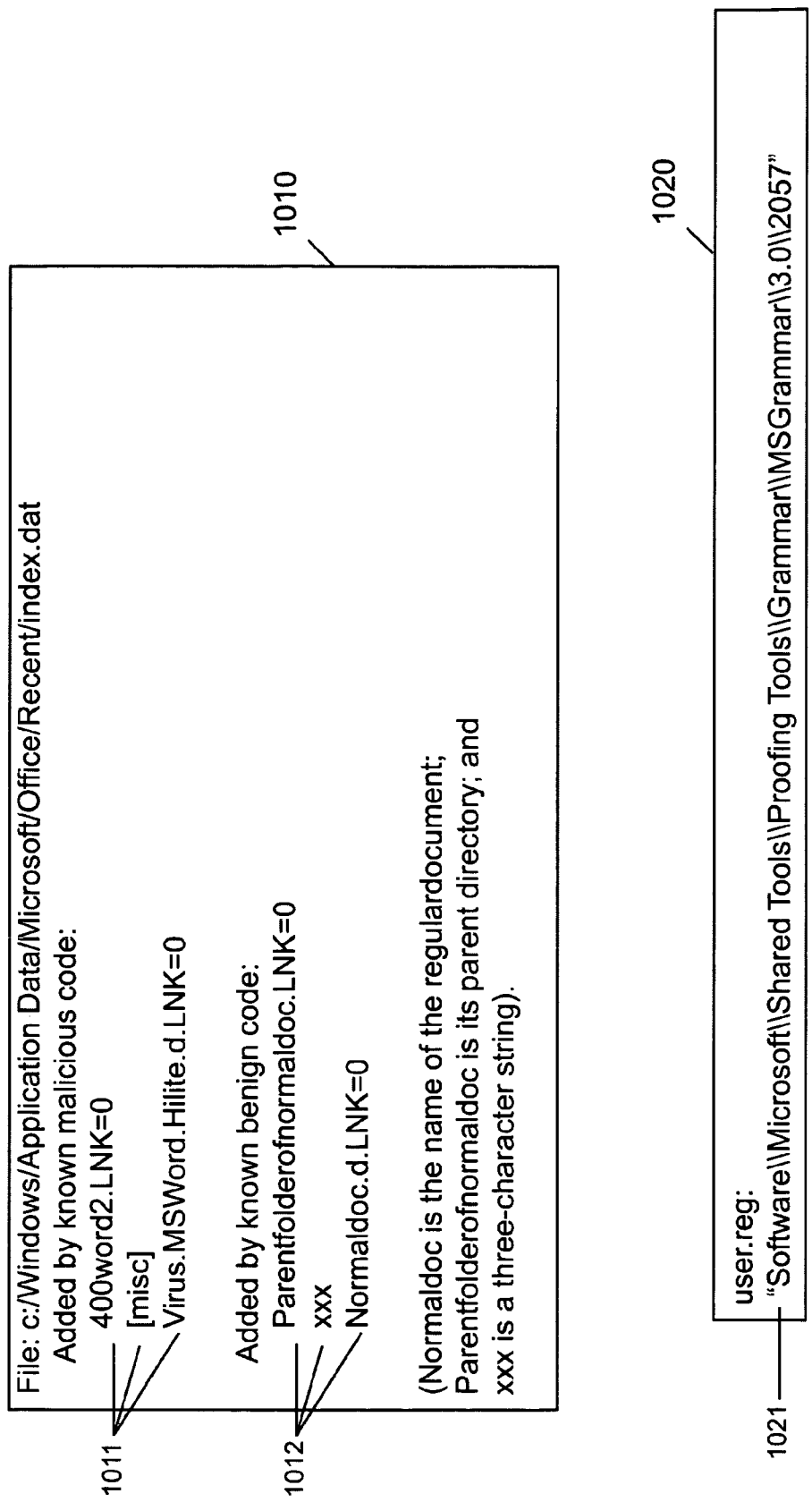
FIG. 10A is an illustration showing changes which can be interpreted as malicious in accordance with some embodiments of the disclosed subject matter.

FIG. 10A, box 1010, illustrates an example of changes caused by the execution of a malicious document. In this case, lines 1011 have been added to the file index.dat as a result of executing a malicious document. However, on this system, when opening benign documents, either no change in the index.dat file is observed or lines 1012 are added. Accordingly, in some embodiments, if the execution of a document causes lines 1011 to be added to index.dat, the document can be considered malicious, at 640. Box 1020, line 1021, identifies a portion of a user registry section that, in some systems, is only modified when malicious documents are opened. Accordingly, in some embodiments, a document that adds line 1021 to user.reg can be considered malicious, at 640.

Figure 10B:
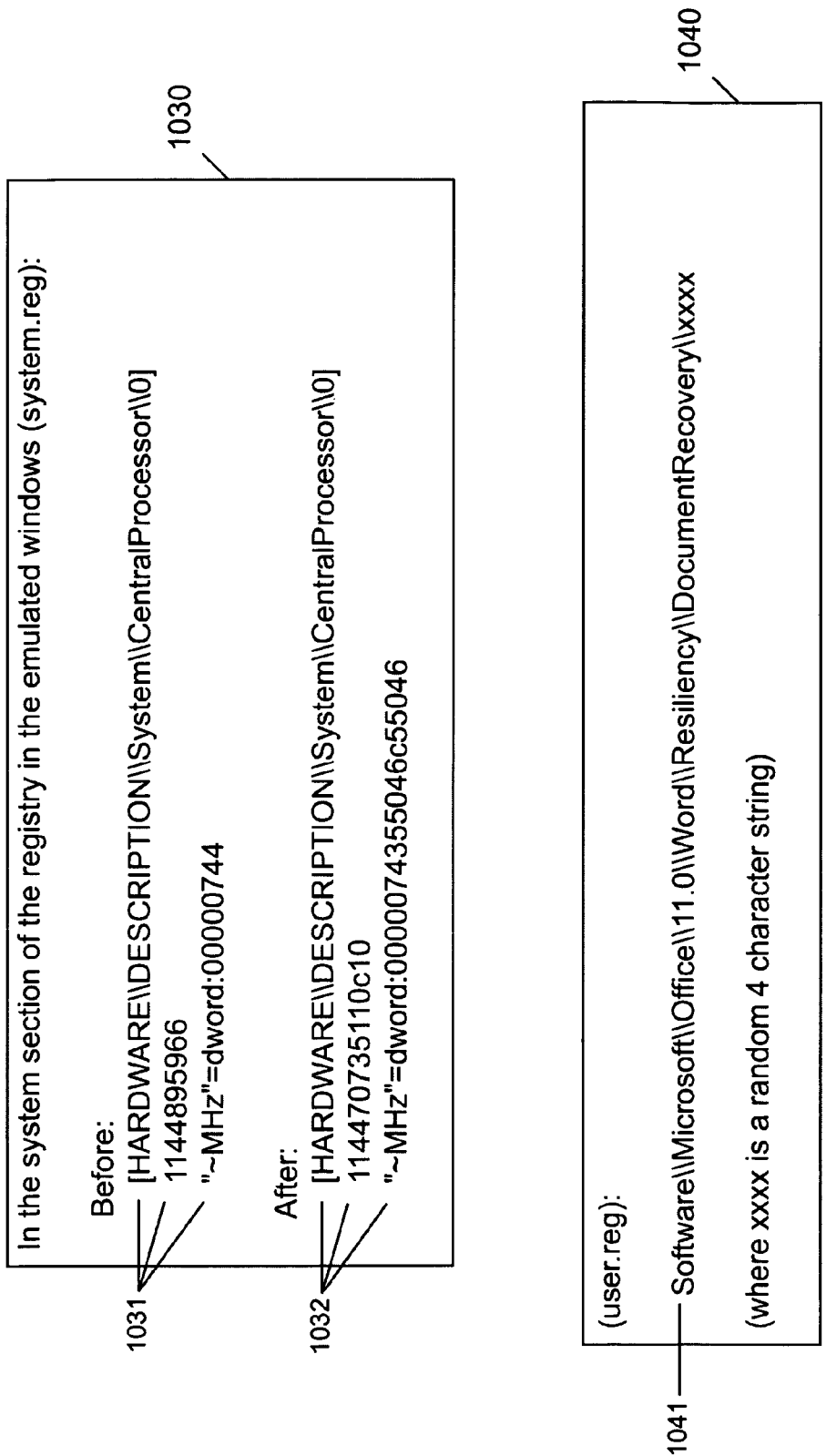
FIG. 10B is an illustration showing changes which can be interpreted as benign in accordance with some embodiments of the disclosed subject matter.

FIG. 10B, box 1030, illustrates example changes made, in some systems, by execution of a benign document. The contents of the system section of the registry in an emulated environment before running the benign document are shown in lines 1031. The contents of the system section of the registry in an emulated environment after running the benign document are shown in lines 1032. Box 1040, line 1041, illustrates a key entry that is expected to be added to the user registry section in some systems. In such systems, when changes 1032 or 1041 are observed they will not be considered to provide an indication of attack.

In considering some other changes, for example, observed using method 910, assume the following. There is a system where all benign files modify system.reg and user.reg files and most of the time also modify index.dat. However, there are some cases of malicious files that do not change user.reg. This constitutes a considerable change from normal behavior and can be used to categorize a document that exhibits this behavior as malicious. Hence, in such a system, the absence of these changes can be used to indicate a file is malicious, at 640. In this example system, it can also be that both benign and malicious documents that use network connections modify the system.reg registry section. However, some of the malicious documents modify system.reg considerably more than is usual for benign files. Such behavior can be used to reveal the presence of malicious code in an unknown file, at 640.

Figure 11:
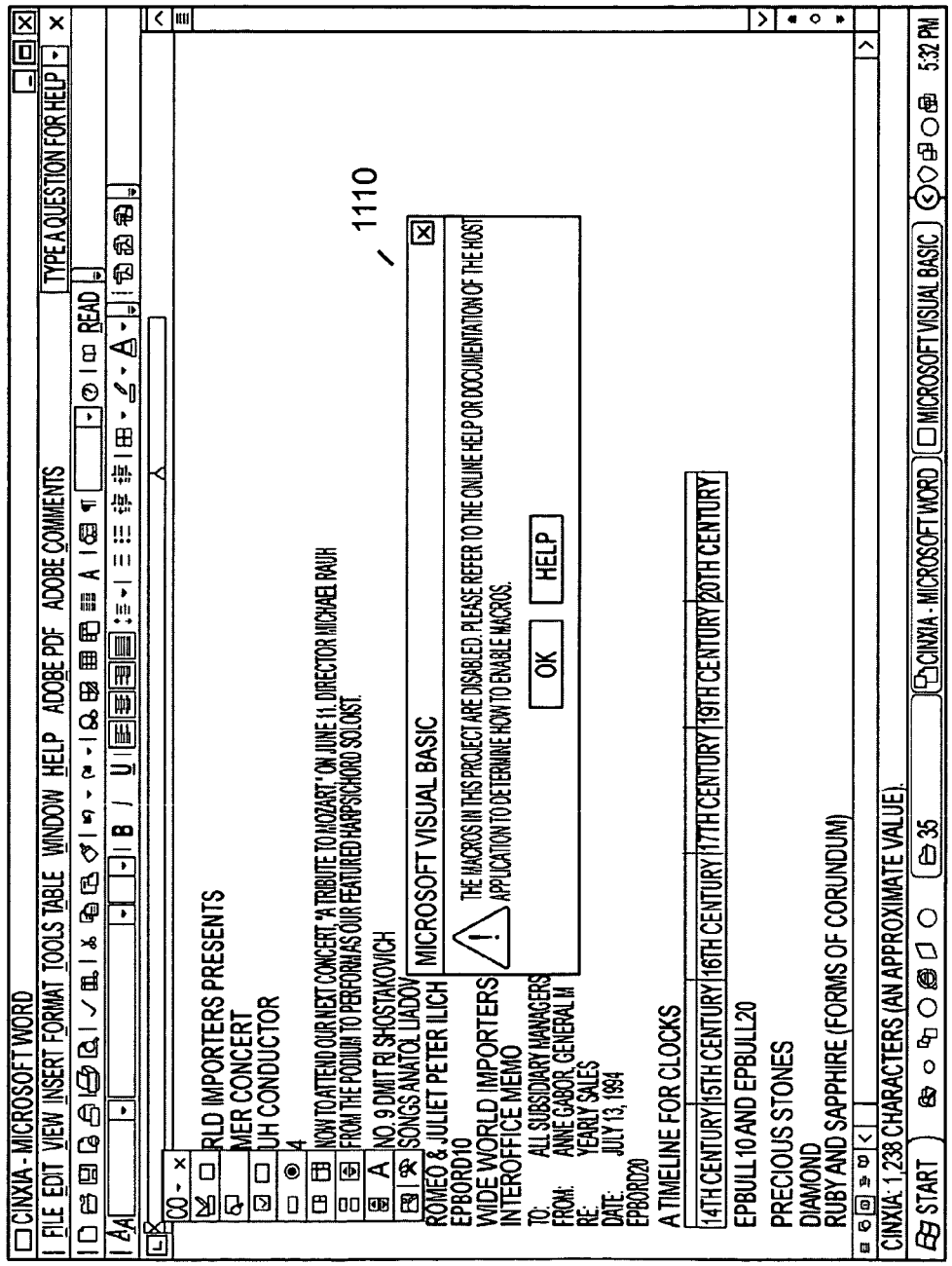
FIG. 11 is an illustration of a screenshot of a message that can be interpreted as indicating attack in accordance with some embodiments of the disclosed subject matter.
Figure 12:
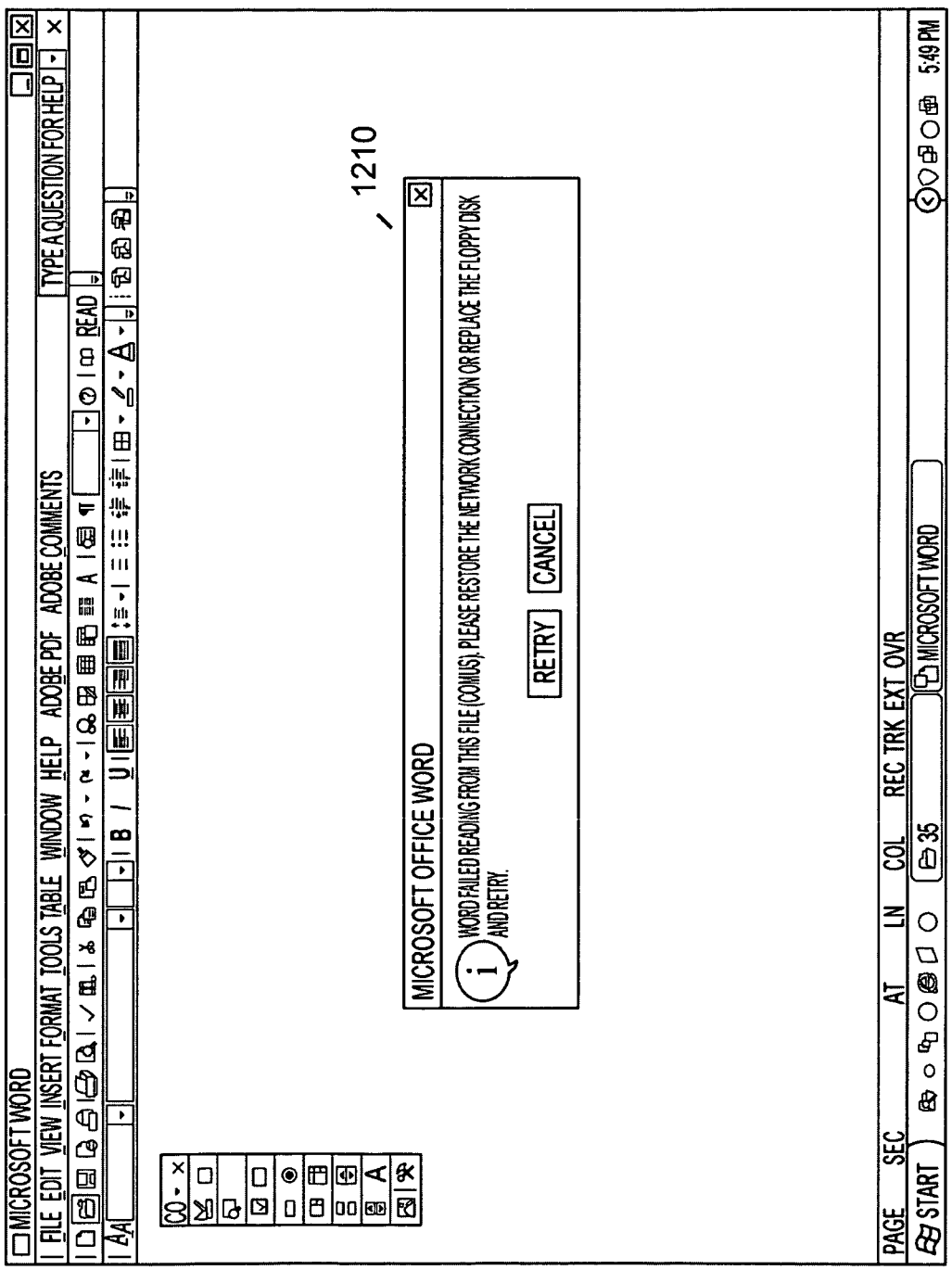
FIG. 12 is another an illustration of a screenshot of a message that can be interpreted as indicating attack in accordance with some embodiments of the disclosed subject matter.

Returning to FIG. 6, in some embodiments, if the changes are not considered malicious, at 640, it can be determined, at 650, whether an abnormal message was produced, and if so, document 10 can be reported, at 50, as including malicious code. For example, some embodiments can examine system messages that do not cause an operating system or emulated environment to fail, but can be indicators of malicious code causing part of an application to gracefully terminate. For example, a user can be presented with a popup window requesting his input or intervention before the document can be viewed. Such a popup message can be used for detection of malicious documents. For example, FIG. 11 and FIG. 12 illustrate pop-up messages 1110 and 1120 that can be considered an indication of malicious code. Which pop-up messages to consider malicious can be determined by comparing pop-up messages observed at 650 to a list of known messages which indicate the presence of malicious code. This list can include messages detected, for example, when running a known malicious document in an environment 500, but not in environment 550 or detected only when running malicious code in any environment. In some embodiments, which changes to consider malicious, at 630, or messages, at 650, can be controlled by user and/or administrator settings. This can be used, for example, to set a level of risk a user of the system is willing to accept.

Again, referring to FIG. 6, if an abnormal message was not detected, at 650, the document can be reported as benign, at 50. In different embodiments, various tests can be performed, at 40, in various orders and whether a specific test is run can depend on the success or failure of another test. For example, in some embodiments, test 640 may only be run if test 620 was successful, while in other embodiments each test may be run every time. Whether to run, and in what order to run, various tests (e.g., 620, 640, and 650) can be controlled by settings set by, for example, a user and/or system administrator. The response to the detection of attack can also be controlled by such settings. In addition, dynamic analysis, at 40, can include various other tests.

Figure 13:
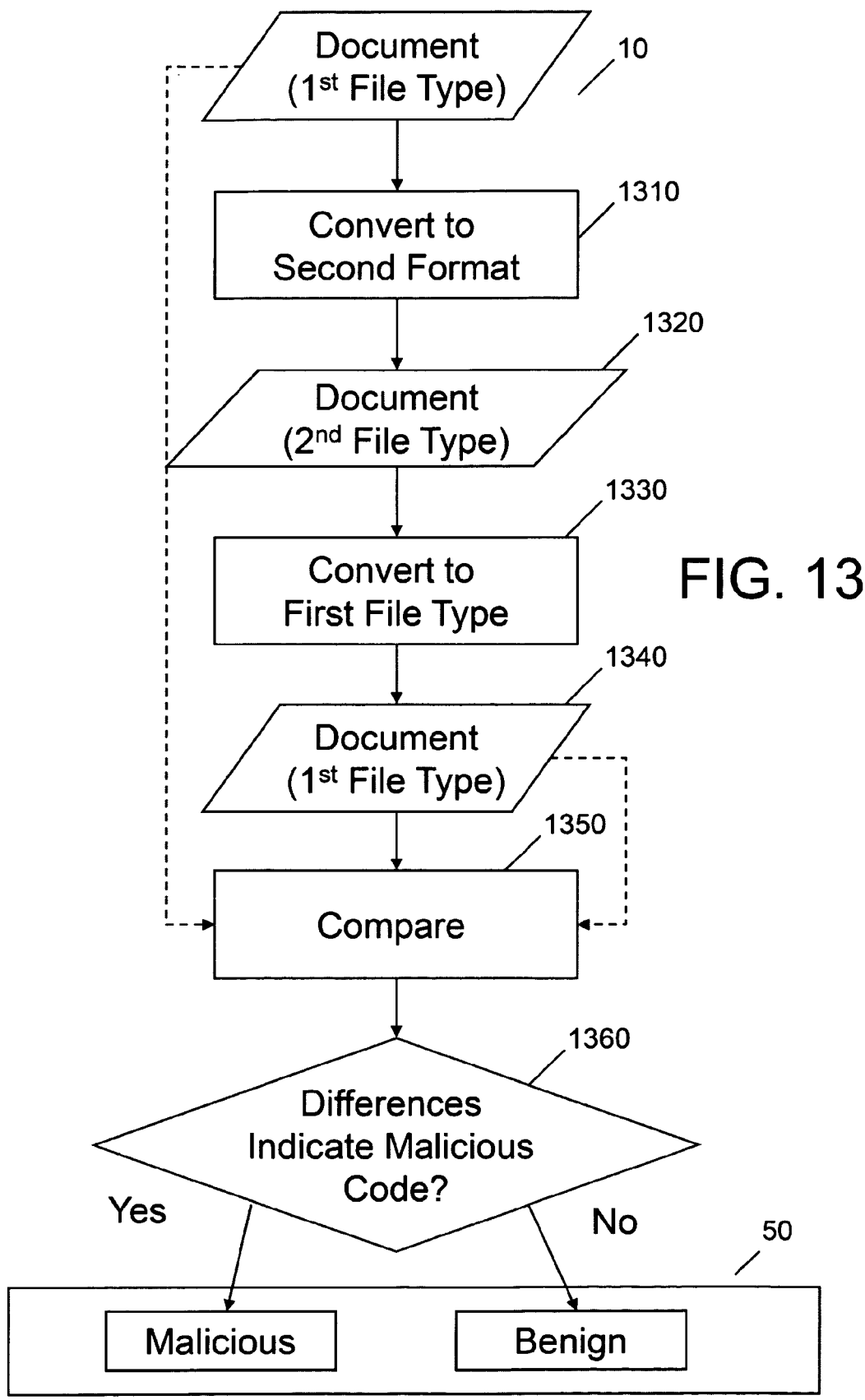
FIG. 13 is a simplified illustration of a method for detecting attack on a digital processing device in accordance with some embodiments of the disclosed subject matter.

As illustrated in FIG. 13, some embodiments can convert, at 1310, document 10 from a first file format to a document 1320 of a second file format. Document 1320 can then be converted, at 1330, to a third document 1340 of the first file format. Document 1340 and document 10 can be compared, at 1350, to determine differences. At 1360, it can be determined whether the differences indicate the presence of malicious code. Comparing, at 1350, can include, for example, a comparison of the data which makes up document 10 and document 1340. In such embodiments, the method of FIG. 13 can be performed for example, at 30 of FIG. 1. Comparing, at 1350, can also include executing document 10 and document 1340, in at least one environment, and comparing their behavior and/or or differences in their behavior to, for example, known differences between benign and malicious code. In such embodiments, the method of FIG. 13 can be performed, for example, at 40 of FIG. 1.

In some embodiments, converting, at 1310 can include for example, using a virtual PDF printer. If, for example, a Microsoft® Word® document includes a table, which includes malicious code, converting the document (including the table), at 1310, to a PDF and then converting the PDF, at 1330, back to a Word® document can produce a Word® document which appears the same as the original, but no longer contains the malicious code. In addition, the original Word® document and the new Word® document can be compared and it can be determined that differences between them appear to be due to malicious code. In some embodiments, detection model 35 and/or detection model 45 can be updated to include, for example, signatures of, or behavior observed by, the malicious code detected at 1360.

Some embodiments provide a toolkit that can implement static analysis techniques and/or parsing, such as, for example, those illustrated at 20 and 30 of FIG. 1. Some embodiments of such a toolkit can include a graphical user interface (GUI). The toolkit can be implemented using various methods. For example, it can be implemented using the Java 2 Platform Standard Edition 5.0 Development Kit (JDK 5.0) and can operate on a platform using J2SE Runtime Environment 5.0 (JRE 5.0). The toolkit can implement static analysis techniques using, for example, a database application on top of a MySQL database.

Figure 14:
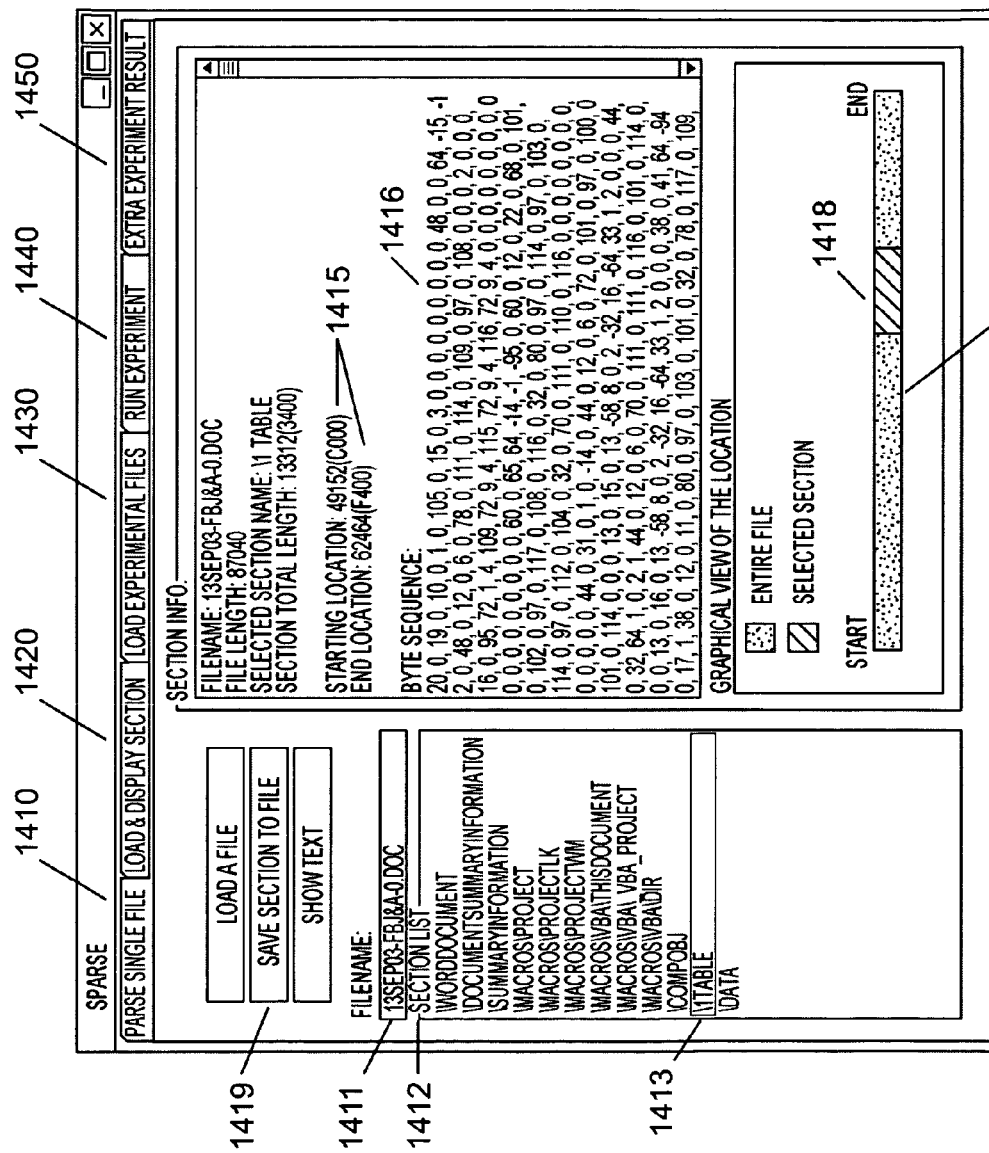
FIGS. 14-18 are illustrations of screenshots of a graphical user interface (GUI) for a toolkit in accordance with some embodiments of the disclosed subject matter.

An embodiment of a GUI to a toolkit implementing static analysis methods is illustrated in FIG. 14. The GUI includes five tabs. Tabs 1410 and 1420 are directed to parsing and displaying documents. Tabs 1430, 1440, and 1450 are directed to performing and displaying the results of training and testing documents. Tab 1410, labeled, "Parse Single File", displays the filename 1411 of document 10 and names of the parsed sections 1412. The information about the selected section, in this case section 1413, is displayed in panel 1414. The information can include, for example, the file length, section length, section offset 1415 in this file, and the exact byte sequence 1416. The byte values of sequence 1416 are represented in decimal format, ranging from −128 to 127, and the offsets 1415 can be displayed using both decimal and hexadecimal format. A bar 1417 is located at the bottom of the display that shows the location of the selected section in the file. The bar 1417 represents the entire file 1411. Section 1418 of the bar represents the selected section 1413. In some cases, a section can have more than one subsection and can be distributed in different areas in a file. In some embodiments, various colors and/or patterns can be used to identify the various sections and/or subsections. For example, section 1418 of the bar can be red, and the rest of the bar 1417 can be blue.

Figure 15:
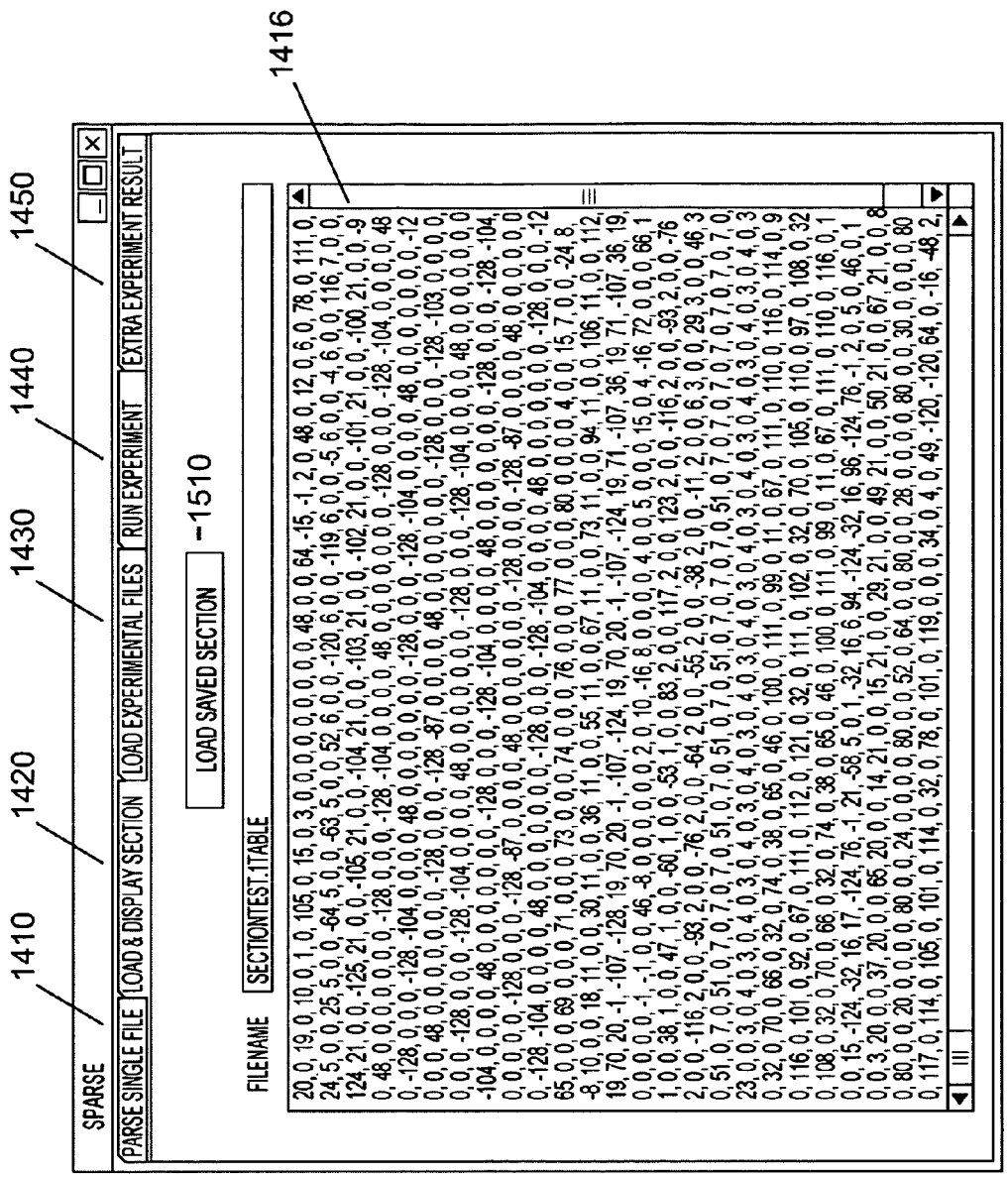
Figure 16:
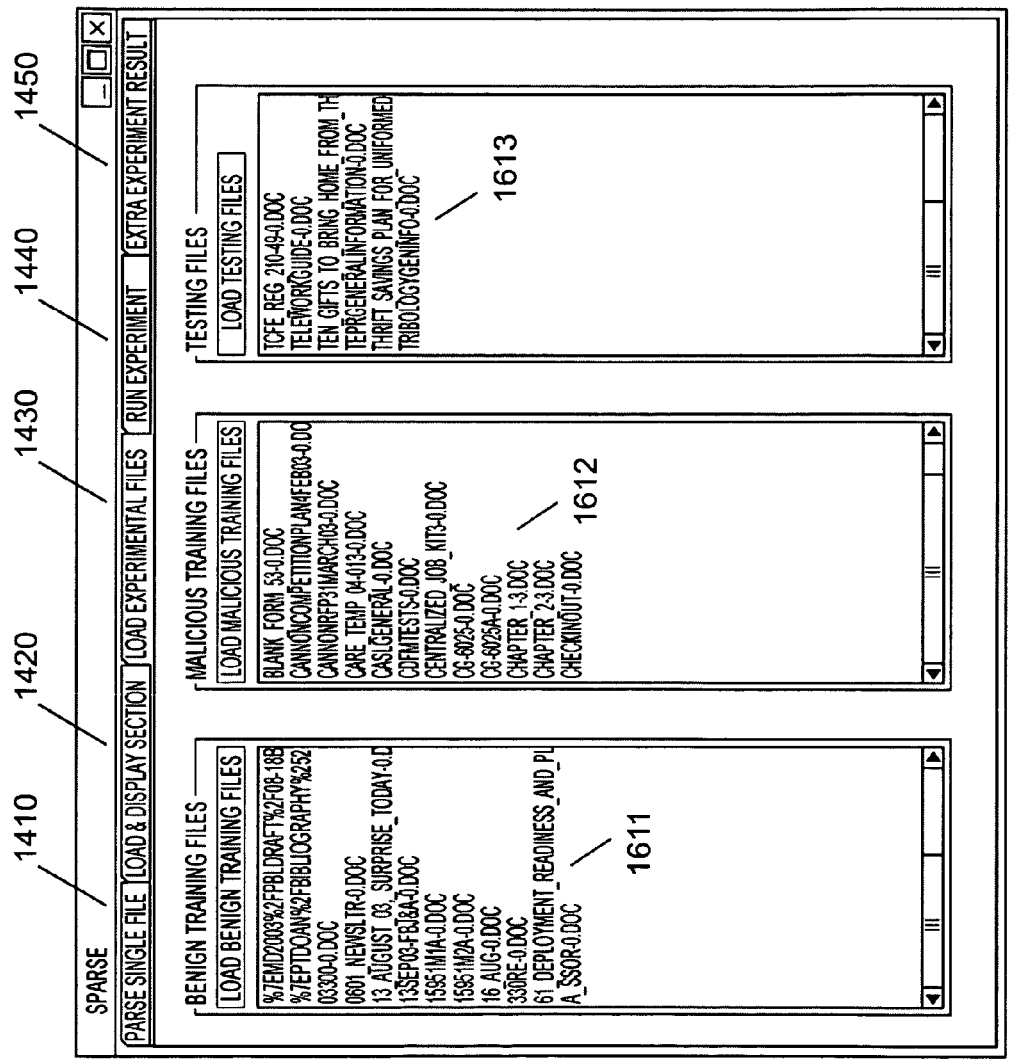

In some embodiments, a user can save the byte sequence of a selected section 1413. This can be done, by using the "Save Section to File" button 1419. A section 1413 can be loaded and displayed in the tab "Load & Display Section" 1420 using button 1510 as illustrated in FIG. 15. In the "Load Experimental Files" tab 1430, illustrated in FIG. 16 a user can specify and load benign training files 1611, malicious training files 1612, and testing files 1613.

Figure 17:
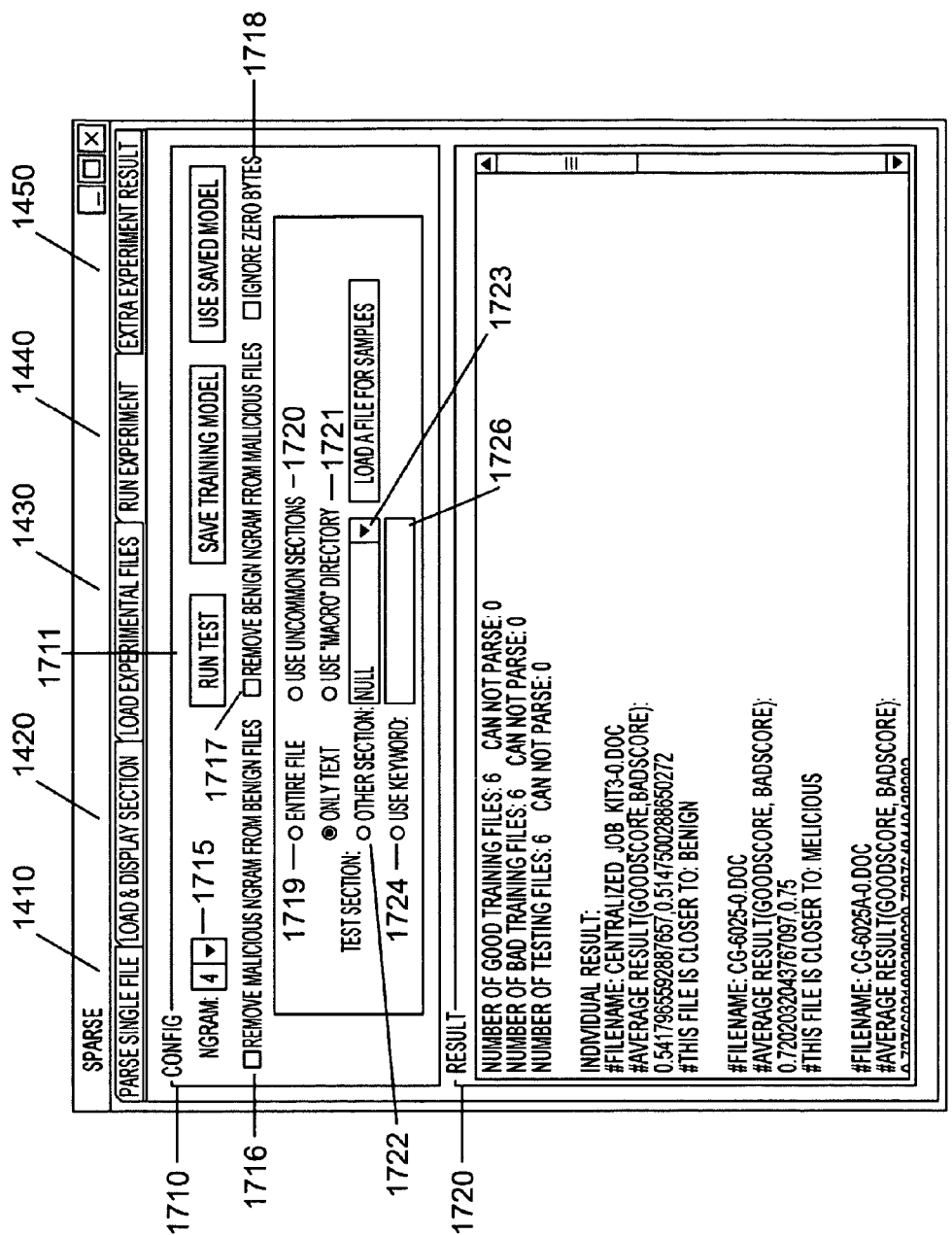

Tab 1440, "Run Experiment," illustrated in FIG. 17, includes panel 1710, which displays configuration information, and panel 1720, which displays results. The run test button 1711, starts an experiment. Button 1712 can save the current training model and button 1713 can load a previously saved training model. Configuration panel 1710 can include various configurations options. For example, option 1715 can be used to set the size of n-grams extracted from the files.

Option 1716 can be set to remove malicious n-grams from benign files. For example, when training the benign files, n-grams that appear in a malicious model can be removed. Option 17 can be set to remove benign n-grams from malicious files. For example, when training the malicious files, n-grams that appear in a benign model can be removed. Option 1718 can be set to ignore zero bytes. For example, when training the model, zero byte sequences (e.g., 0, 00, 000, 0000) can be skipped.

When option 1719 is set, the entire file is trained and tested. When option 1720 is set, only uncommon sections are trained and tested. Common sections include, for example, Word-Document, SummaryInformation, 1 Table, CompObj, Data, and DocumentSummaryInformation. When option 1721 is set, only the text section (e.g. a WordDocument section) is trained and tested in the files. When option 1721 is set, sections that have a "macro" keyword are trained and tested. Using option 1722 and field 1723, a user can select a specific section to test. Using option 1724 and field 1726, a user can specify a keyword or keywords of a section to be trained and tested.

As illustrated in results panel 1720, in some embodiments, the score of a document that is calculated from the benign and malicious models is displayed here. The higher the similarity score, the closer the section of the document is to the model that was loaded. The score of a section and the average score of the displayed sections can be displayed when more than one section is selected.

Figure 18:
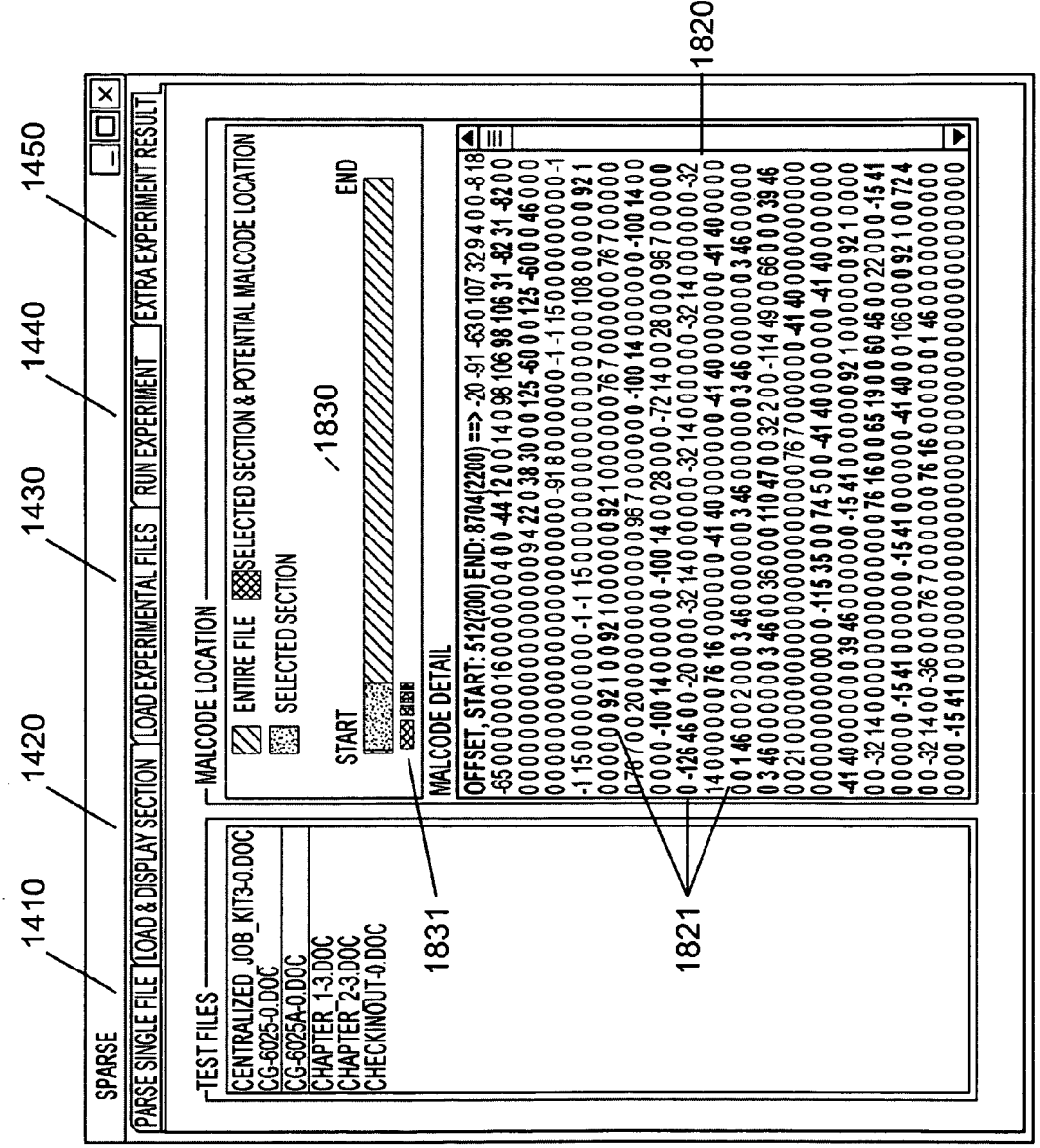

Tab 1450, "Extra Experimental Result", illustrated in FIG. 18, can graphically display a suspect malicious code location within a file. The suspicious regions are represented in bold 1821 in panel 1820 and are also shown at 1831 in bar 1830. In some embodiments, byte sequences of selected testing sections are checked using a Bloom filter in the benign training model. A byte sequence with size n (n-gram) is deemed to be suspicious if it does not appear in the benign model.

Figure 19:
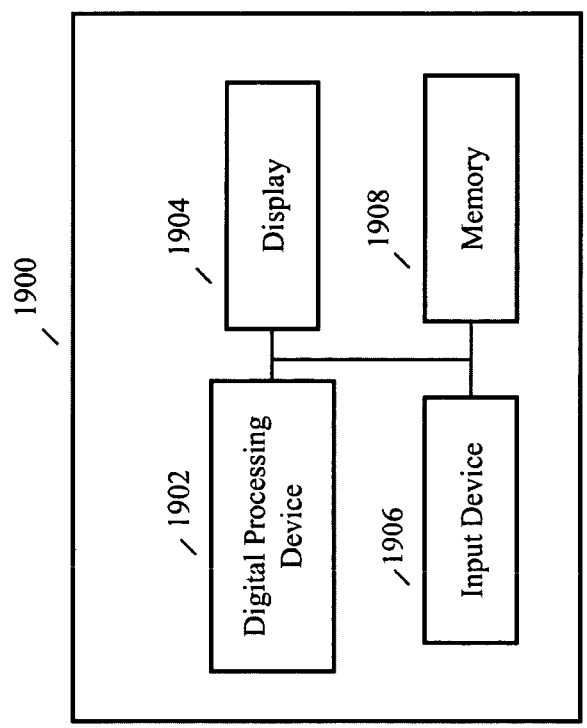
FIG. 19 is an illustration of a system that can be used in accordance with some embodiments of the disclosed subject matter.
Figure 20:
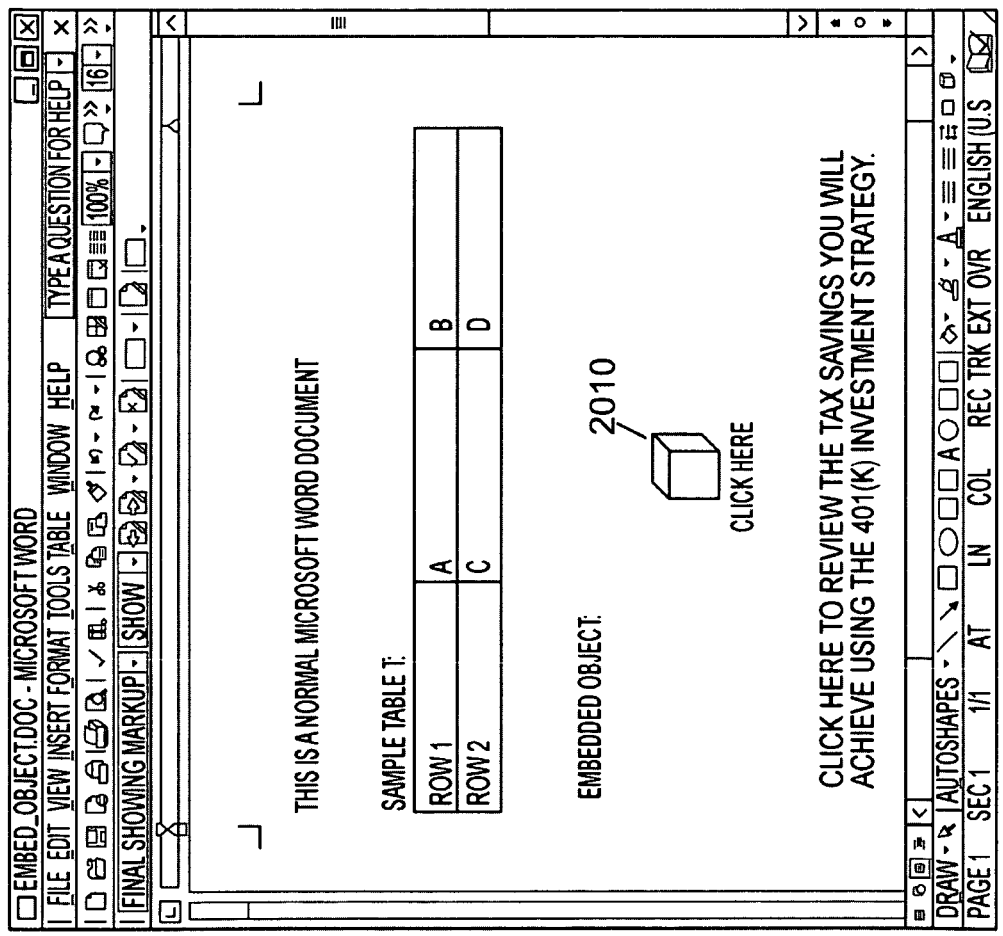
FIG. 20 is an illustration of a screenshot of embedded malicious code that can be detected in accordance with some embodiments of the disclosed subject matter.
Figure 21:
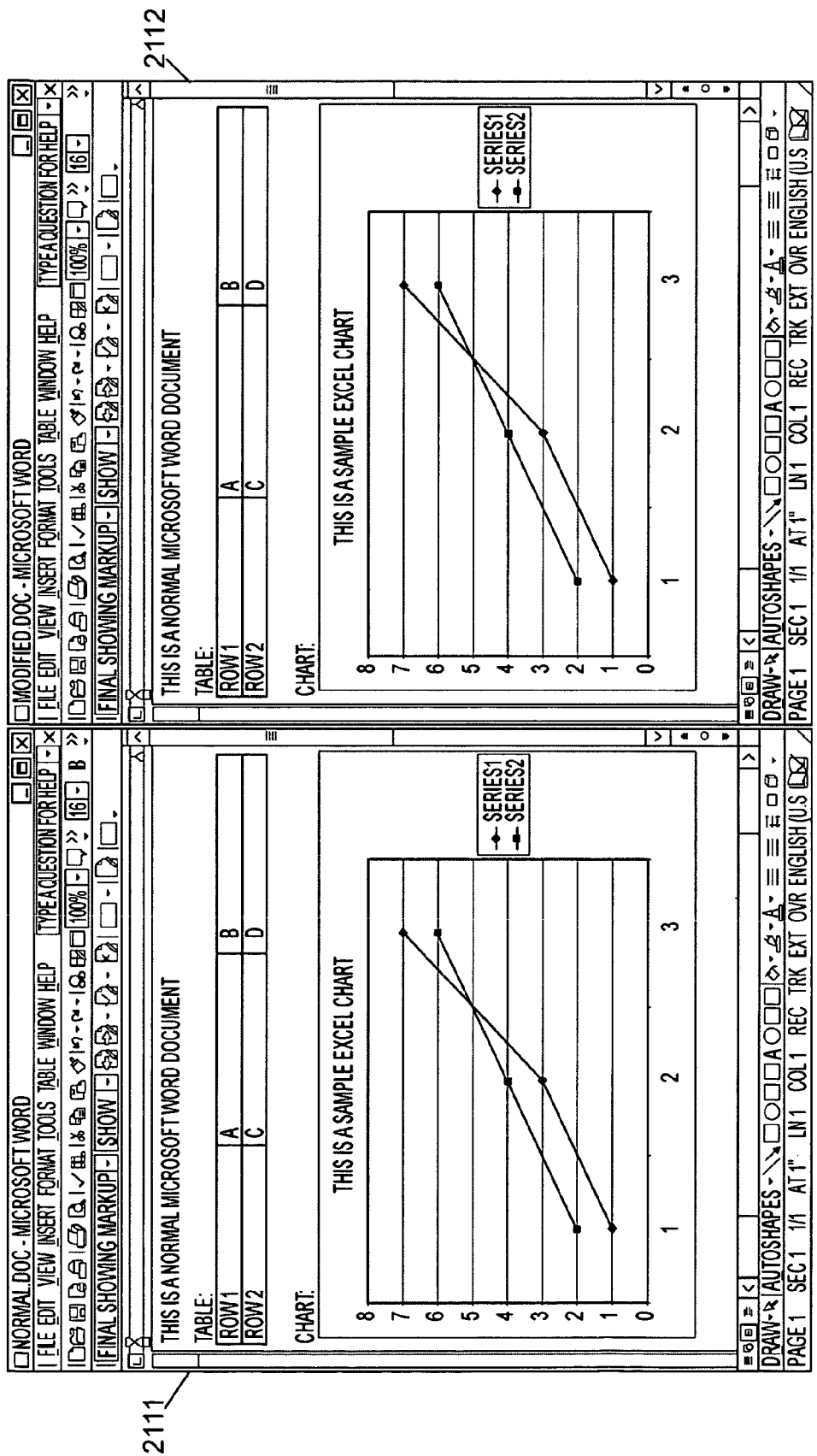
FIG. 21 is another illustration of a screenshot of embedded malicious code that can be detected in accordance with some embodiments of the disclosed subject matter.

FIG. 19 illustrates a system 1900 that can be used in accordance with some embodiments of the disclosed subject matter. System 1900 can include, among other things, digital processing device 1902, display 1904, input device 1906, and memory 1908, which can be interconnected. Digital processing device 1902 can be, for example, a processor, a digital signal processor, a controller, etc. In some embodiments, memory 1908 contains a program for controlling digital processing device 1902. Memory 1908 can also contain applications for performing the methods described herein, for example, the method illustrated in FIG. 1. In some embodiments, various other applications can be resident in the memory 1908 and executed by digital processing device 1902. System 1900 can include additional components, for example, additional input and/or output devices. Various systems 1900 can be interconnected and/or connected with other devices through, for example, networks such as the Internet, cellular networks, local area networks, and/or wide area networks. In some embodiments, the method illustrated in, for example, FIG. 1, can be implemented across various systems 1900. For example, with reference to FIG. 1, static analysis, at 30, can be performed on a first system 1900 and dynamic analysis, at 40, can be performed on a second system 1900. A document 10, model 35, and/or model 45 can be sent to and from various systems 1900 through various networks.

It should be noted, however, that additional detection approach can be provided. For example, there may be situations where malicious code can evade detection approaches that use static and/or dynamic detection and analysis.

Figure 22:
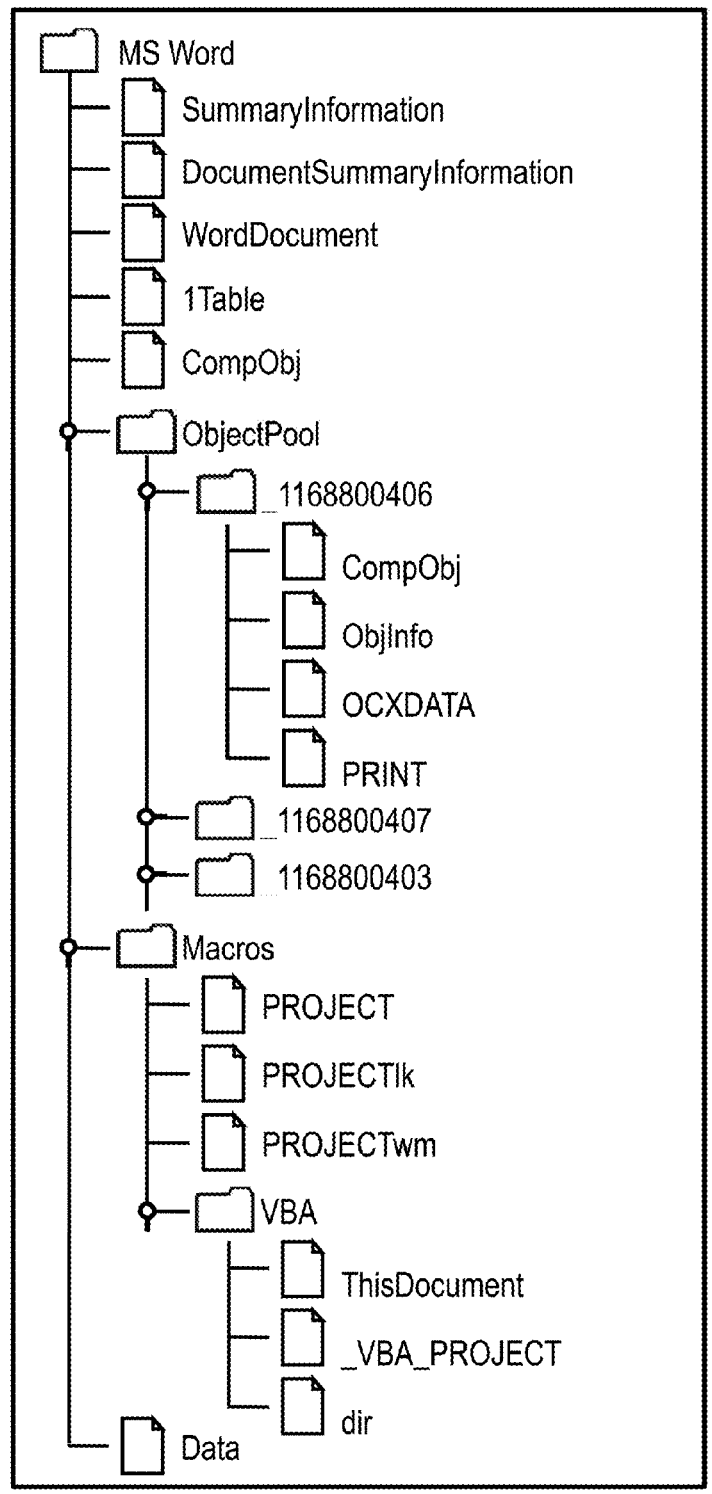
FIG. 22 is an illustration showing an example of the internal structure of a parsed document in Object Linking and Embedding (OLE) structured file format in accordance with some embodiments of the disclosed subject matter.

For example, the 1Table sector shown in FIG. 22, which illustrates an example of the internal structure of a parsed document in Object Linking and Embedding (OLE) format, is currently one of the most vulnerable portions of Word documents. The data in the 1Table sector can include text such as "Times New Roman," identifying fonts, or numbers used to define sizes, locations, flags, and indices, or code blocks that can be a script or encrypted code. An attacker would likely find it convenient and safe to embed their malicious code in the data section or padding areas of Microsoft Word or any other suitable word processing program.

In addition to the pointers and data, the 1Table sector can include a particular sequence of characters which, in some cases, are keywords or special values that cannot be changed without crashing the word processing program (e.g., numbers that indicate the beginning of a document or a sector, streams of Microsoft® Office® reference schemas, and/or numbers that indicate the end of structures). It should be noted that these values are not arbitrarily modified.

In accordance with some embodiments of the disclosed subject matter, arbitrary data transformation mechanisms can be provided that are designed to detect stealthy embedded attacks that may use mimicry strategies to evade the abovementioned static and dynamic detection and analysis approaches. More particularly, some embodiments can modify and damage potentially embedded malicious code or any other suitable data segments. For example, in some embodiments, the arbitrary data transformation mechanisms can arbitrarily change the value of one or more data segments in a document in such a way as to purposely damage any hidden malicious code that may be embedded in one or more sections of the document. Consequently, the embedded malicious code not only fails, but also introduces a system exception or error (e.g., an application crash, a recognizable error state, etc.) that can be detected with little difficulty.

In addition, it should be noted that altering normal data used to describe the content of the document would not crash the application (e.g., a word processing program) in cases where no malicious code existed. The display of the document can be different or distorted, but the application does not crash. For example, the characters, font size, and type are changed in the document, but the word processing program can display the document without causing exceptions.

It should also be noted that these mechanisms do not require training For example, these arbitrary data transformation mechanisms may not require the use of benign training files, malicious training files, testing files, etc. Instead, the arbitrary data transformation mechanisms disables potentially embedded malicious code by altering vulnerable data values.

It should further be noted that, in some embodiments, these arbitrary data transformation mechanisms can be applied in a safe sandbox environment or virtual machine, where such a transformation can be reversed after testing the document with the altered or transformed data.

These mechanisms can be used in a variety of applications. For example, these mechanisms can be incorporated into the functionality of an application (e.g., Microsoft® Word® or another suitable word processing program), where the testing is handled within the application. In another example, these mechanisms can be added a security feature to enhance the safety of Microsoft® Word® documents. The arbitrary data transformation mechanisms can be used as a safety check when opening Microsoft® Word® documents, where the mechanisms can be applied within Word in a sandbox environment or virtual machine or by a separate analysis application, such as the detection mechanisms described above or a third party antivirus scanner If the document is deemed benign, the document can then be opened by the word processing program in its normal fashion after reversing the arbitrary data transformation.

Figure 23:
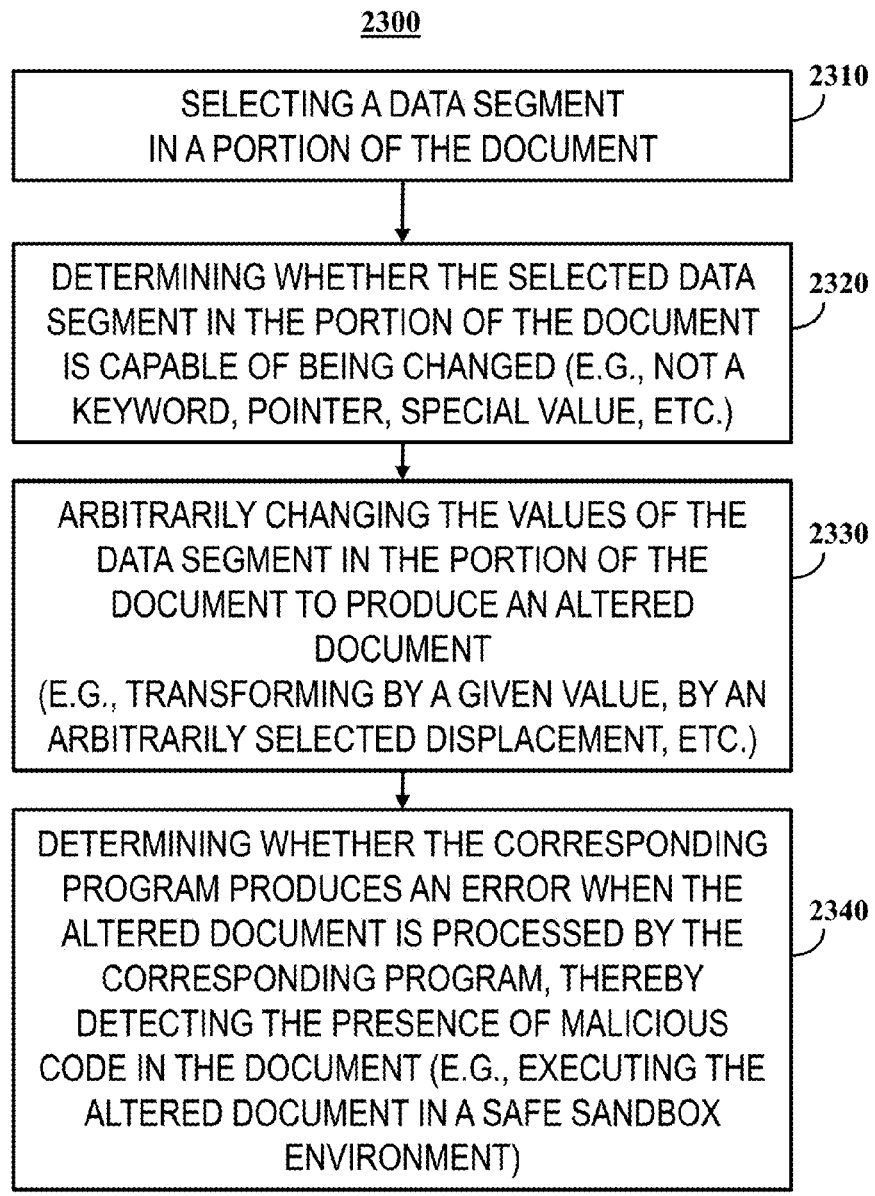
FIG. 23 is a simplified illustration of a method for detecting malicious code in electronic documents in accordance with some embodiments of the disclosed subject matter.

Methods, systems, and media for detecting malicious code in electronic documents are provided. In some embodiments, the methods, systems, and media of the disclosed subject matter can detect malicious code in electronic documents by arbitrarily changing data in at least a portion of the document to produce an altered electronic document and then determine whether the altered electronic document produces an error (e.g., an application crash, a recognizable error state, etc.) when processed. For example, as illustrated in FIG. 23, a data segment in a portion of a document can be selected at 2310. The data segment can be selected from a data section or padding area of the document (e.g., the 1Table sector shown in FIG. 22). In some embodiments, the data segment can be arbitrarily selected from multiple data segments in the data section and/or padding area of the document.

At 2320, in some embodiments, it can be determined whether the selected data segment in the portion of the document is capable of being changed. For example, in addition to pointers and data, the 1Table sector and/or other sectors of the document can include a particular sequence of characters which, in some cases, are keywords or special values that cannot be changed without crashing the word processing program (e.g., numbers that indicate the beginning of a document or a sector, streams of Microsoft® Office® reference schemas, and/or numbers that indicate the end of structures). These values are not arbitrarily modified.

In some embodiments, it can be determined whether the selected data segment in the portion of the document is a pointer. It should be noted that embedding malicious code in pointers can be difficult. For example, if the malicious code is created as a pointer value, the attacker has to ensure that the document does not cause an error in the word processing program before the malicious code is launched. That is, arbitrarily replacing a pointer value with another would likely crash the word processing program when it processes that pointer. In another example, pointers are generally short (e.g., from one bit to a few bytes) and are generally not contiguous. Because of this, there may not be sufficient space to place the malicious code in a pointer area without overwriting the data values or padding values adjacent to the pointer. Accordingly, in some embodiments, pointer values can be excluded from being arbitrarily changed.

At 2330, the values of the selected data segment in the portion of the document can be arbitrarily changed. For example, the values of the data segment can be arbitrarily changed to arbitrarily chosen different values (for non-zero data values that can be safely changed). In response, the binary content of illegally embedded code is changed to arbitrary values and, when processed, forces it to crash or to be disabled. That is, the execution of buffer overflow or other vulnerabilities is not avoided. Instead, the malicious code is damaged such that it purposely crashes or creates an error state.

Alternatively, normal data (without malicious code) used to describe the documents can be changed to other values without serious error. It should be noted that the display of the altered document can be changed and can, in some cases, even appear incomprehensible. However, the word processing program or any other suitable program processing the document does not crash when malicious code is not present.

In some embodiments, for the byte values that can be changed, those data values can be increased or decreased by an arbitrarily chosen displacement x (e.g., changing the character "A" to "Q," increasing numerical values by 2, etc.). For example, the value of x can range from 1 to 3 (or −3 to −1), so a y-byte long data section has |2x$^y$| possible permutations, where x can be positive or negative. The range of x is 256, which is the total possible values of a byte.

Alternatively, the value displacements can be changed to specific values that are defined according to the type of the structure using that data. In doing this, the display of documents may not be damaged and can be transformed into another style or type.

It should be noted that the arbitrary data transformation mechanisms described herein can transform a different data segment each time and, because each single byte has 256 possible values and an n-byte data sequence has 256$^n$ possible permutations, an attacker cannot predict or guess what transformation is applied to a document's data sections. By changing the byte values in a random non-predictable fashion, the attacker cannot predict or guess what transformation is being applied to the data sections of a particular document. For example, if the arbitrarily data transformation mechanism is performed whenever a document is opened, the changed byte values can be different each time a document is opened. Accordingly, it is difficult to continuously guess the transformation using a brute force approach. Each attempted probe requiring the opening of a document produces a newly transformed instance of the document, thereby creating moving targets that thwart brute force guessing approaches.

In some embodiments, in response to arbitrarily changing the values of the data segment, the display of the document can be distorted. For example, the font display for ASCII data used in the 1Table sector can appear with the "Times New Roman" font name, where the corresponding byte values are "54 69 6D 65 73 20 4E 65 77 20 52 6F 6D 61 6E." These data values are the data that describe the text type font. Arbitrarily changing one of these values to another value, including the extended ASCII characters, does not cause a word processing program, such as Microsoft® Word®, to crash. Instead, the word processing program generally chooses a default font or style if the transformed values were deemed incomprehensible.

Referring back to FIG. 23, at 2340, it is determined whether the corresponding program (e.g., the word processing program) produces an error when the altered electronic document is processed by the corresponding program. For example, these arbitrary data transformation mechanisms can be applied in a safe sandbox environment or a virtual machine.

FIG. 24 is an illustration of a screenshot of two documents before and after applying the arbitrary data transformation mechanism in accordance with some embodiments of the disclosed subject matter. As shown, the data representing the text type 2415 (i.e. FFN or Font Family Name) is arbitrarily changed. It should be noted that the altered document can be opened and displayed without any error. Alternatively, in some embodiments, the word processing program displays a blank page or displays some strange sequence of characters when malicious code is not embedded in the document. If the document is deemed benign, the document can be opened by the word processing program in its normal fashion after reversing the arbitrary data transformation.

On the other hand, stealthy embedded malicious code residing in the data portion is also changed, and, subsequently, either the word processing program crashes or the malicious code is disabled when an attempt is made to execute the malicious code. For example, the hexadecimal Opcode value "6A" and "EB" represent the push and jmp x86 instructions, respectively. If the byte values are increased by 1, they become "6B" and "EC" which are not correct Opcodes. While there can be some instances in which the changed code is valid, it can become another completely unintended instruction. Accordingly, the corresponding program (e.g., a word processing program, an operating system, etc.) is not able to correctly execute the attackers' shellcode and either crashes or terminates the process.

Figure 25:
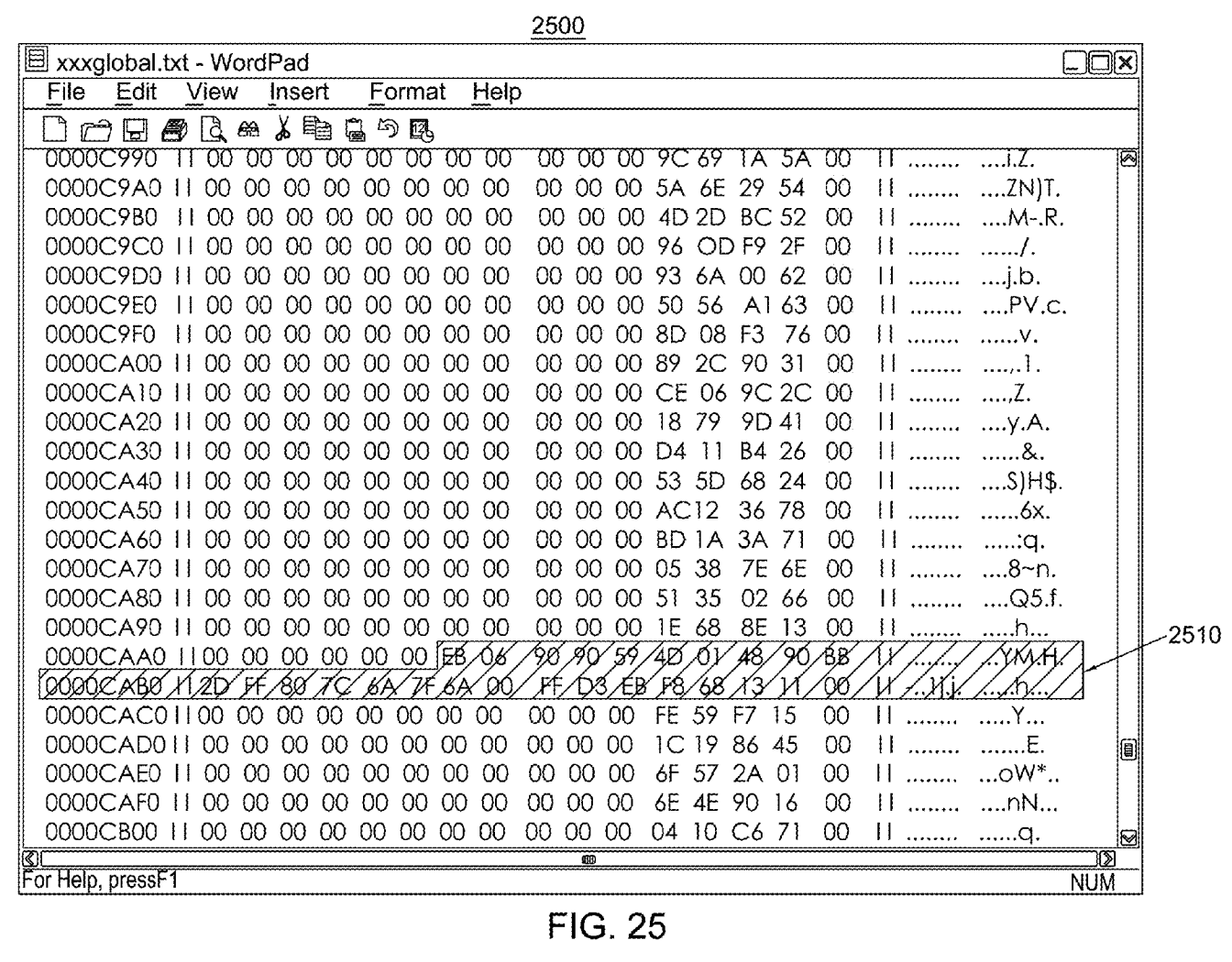
Figure 26:
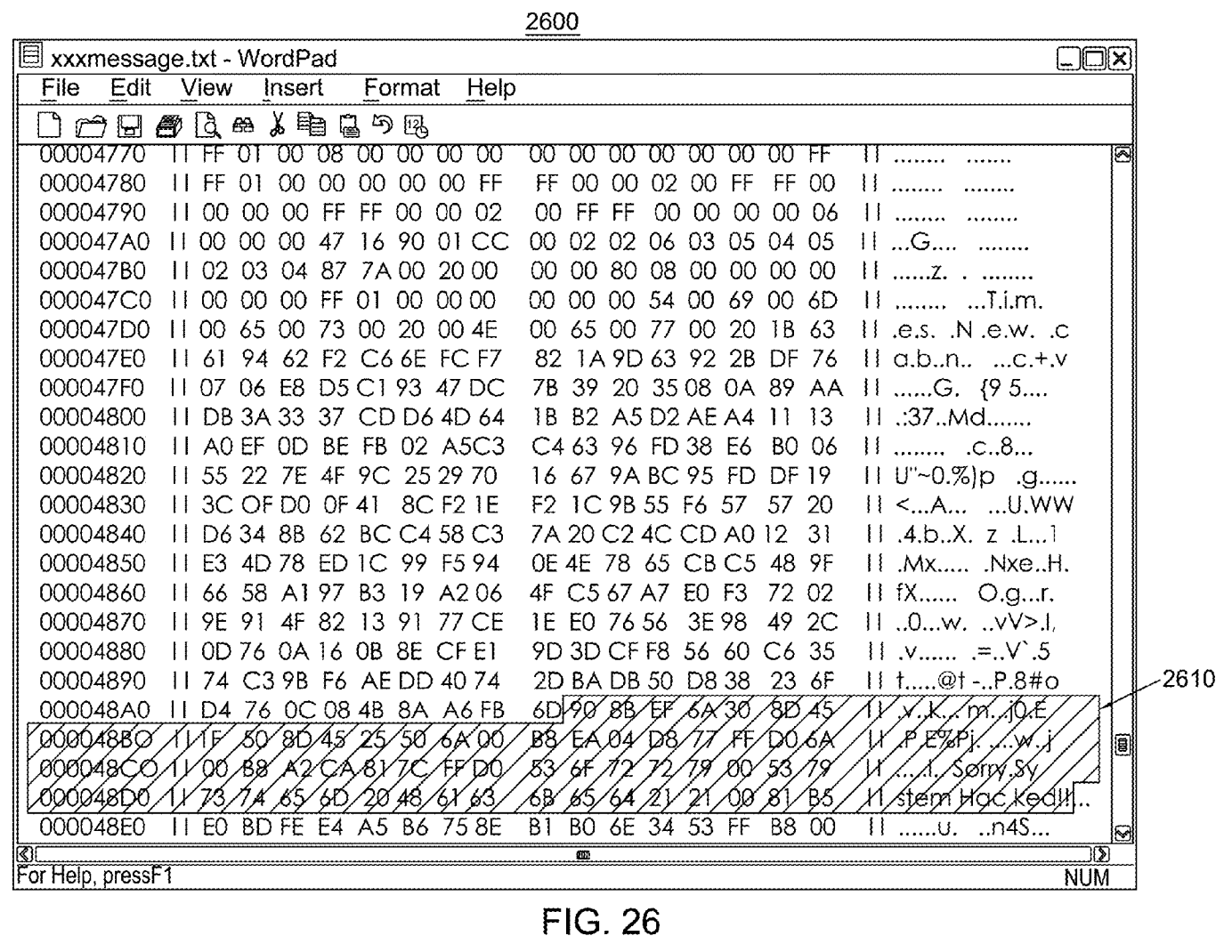

FIGS. 25 and 26 are illustrations showing examples of the detection of malicious code embedded in electronic documents in accordance with some embodiments of the disclosed subject matter. In particular, the binary content of two buffer overflow attacks is shown. In FIG. 25, the list of 4-byte values is a list of pointers (the fcPlfLfo structure), and the zeros are padding values. The highlighted values 2510 are embedded shellcode, which is an infinite loop causing memory corruption. In FIG. 26, the structure is used to describe the Font Family Name (FFN). While the pointer values are not changed, the byte values of the malicious code embedded in the padding area is changed using the arbitrary data transformation mechanisms and, accordingly, the attack is be disabled. Whether the shellcode exhibits obvious or mimicry behavior, the arbitrary data transformation mechanisms are capable of detecting the malicious code.

It should be noted that the word processing program generally does not crash. In some embodiments, the word processing program or any other suitable program displays a message indicating that the document may be damaged. FIG. 27 is an illustration showing two examples of such messages. For example, pop-up window 2710 indicates that the document name or path is not valid. In another example, pop-up window 2720 indicates that the document may be corrupt as the word processing program was unable to read and/or open the document. These error states can include, for example, the inability to open the document, the inability to locate a document, entering an infinite loop causing memory corruption, etc.

These arbitrary data transformation mechanisms can be used in a variety of applications. For example, these mechanisms can be incorporated into the functionality of a word processing program (e.g., Microsoft® Word® or another suitable word processing program), where the testing is handled within the application. It should be noted that, in some embodiments, sections parsed in a proprietary format can be directly tested within the application program without developing an emulator. For example, the Microsoft Office Binary File Format Documentation describes the document format to parse the binary into the correct sectors. By performing the arbitrary data transformation mechanisms within a word processing program or any other suitable application program, the malicious code detection can be performed (e.g., using an internal emulator or sandbox environment) without providing knowledge of the specific proprietary application.

Alternatively, these mechanisms can be added a security feature to enhance the safety of Microsoft® Word® documents. The arbitrary data transformation mechanisms can be used as a safety check when opening Microsoft® Word® documents, where the mechanisms can be applied within Word in a sandbox environment or virtual machine or by a separate analysis application, such as the detection mechanisms described above or a suitable third party antivirus scanner.

Accordingly, methods, systems, and media for detecting malicious code in electronic documents are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention. For example, with reference to FIG. 6, in some embodiments, detection model 45 can store information regarding messages (e.g., pop-up windows) and can be used at, for example, test 650.

What is claimed is:

1. A method for detecting malicious code in electronic documents, the method comprising:
   selecting, using a hardware processor, a data segment in at least one portion of an electronic document;
   determining, using the hardware processor, whether the selected data segment can be altered by changing values of the selected data segment to an arbitrary value without causing the electronic document to result in an error when processed by a corresponding program;
   in response to determining that the selected data segment can be altered, transforming, using the hardware processor, the electronic document to an altered electronic document by arbitrarily altering the data segment in the at least one portion of the electronic document to produce an altered electronic document;
   processing, using the hardware processor, the altered electronic document using the corresponding program;
   determining, using the hardware processor, whether the corresponding program produces an error state when the altered electronic document is processed by the corresponding program; and
   determining, using the hardware processor, that the selected data segment in the at least one portion of the electronic document contains malicious code, in response to determining that the corresponding program produces an error state when the altered electronic document is processed by the corresponding program.

2. The method of claim 1, wherein the electronic document is a word processing document.

3. The method of claim 1, wherein the corresponding program is a word processing program.

4. The method of claim 1, wherein the at least one portion of the electronic document is altered by changing the values of the data segment in the at least one portion by a given value.

5. The method of claim 1, wherein the at least one portion of the electronic document is altered by changing the values of the data segment in the at least one portion by an arbitrarily selected displacement.

6. The method of claim 1, wherein the error is at least one of: a crash of the corresponding program and a recognizable error state.

7. The method of claim 1, wherein the altered electronic document is processed in a sandbox environment.

8. The method of claim 1, further comprising disabling the malicious code in response to the produced error state.

9. A system for detecting malicious code in electronic documents, the system comprising:
   at least one digital processing device that:
     selects a data segment in at least one portion of an electronic document;
     determines whether the selected data segment can be altered by changing values of the selected data segment without causing the electronic document to result in an error when processed by a corresponding program;
     in response to determining that the selected data segment can be altered, transforms the electronic document to an altered electronic document by arbitrarily altering the data segment in the at least one portion of the electronic document;
     determines whether the corresponding program produces an error state when the altered electronic document is processed by the corresponding program; and
     determines that the selected data segment in the at least one portion of the electronic document contains malicious code, in response to determining that the corresponding program produces an error state when the altered electronic document is processed by the corresponding program.

10. The system of claim 9, wherein electronic document is a word processing document.

11. The system of claim 9, wherein the corresponding program is a word processing program.

12. The system of claim 9, wherein the at least one digital processing device is further configured to alter the at least one portion of the electronic document by changing the values of the data segment in the at least one portion by a given value.

13. The system of claim 9, wherein the at least one digital processing device is further configured to alter the at least one portion of the electronic document by changing the values of the data segment by an arbitrarily selected displacement.

14. The system of claim 9, wherein the error is at least one of: a crash of the corresponding program and a recognizable error state.

15. The system of claim 9, wherein the at least one digital processing device is further configured to process the altered electronic document in a sandbox environment.

16. The system of claim 9, wherein the at least one digital processing device is further configured to disable the malicious code in response to the produced error state.

17. A non-transitory computer-readable medium containing computer-executable instructions that, when executed by a processor, cause the processor to perform a method for detecting malicious code in electronic documents, the method comprising:
   selecting a data segment in at least one portion of an electronic document;
   determining whether the selected data segment can be altered by changing values of the selected data segment to an arbitrary value without causing the electronic document to result in an error when processed by a corresponding program;
   in response to determining that the selected data segment can be altered, transforming the electronic document to an altered electronic document by arbitrarily altering the data segment in the at least one portion of the electronic document;
   processing the altered electronic document using the corresponding program;
   determining whether the corresponding program produces an error state when the altered electronic document is processed by the corresponding program; and
   determining that the selected data segment in the at least one portion of the electronic document contains malicious code, in response to determining that the corresponding program produces an error state when the altered electronic document is processed by the corresponding program.

18. The non-transitory computer-readable medium of claim 17, wherein the electronic document is a word processing document.

19. The non-transitory computer-readable medium of claim 17, wherein the corresponding program is a word processing program.

20. The non-transitory computer-readable medium of claim 17, wherein the at least one portion of the electronic document is altered by changing the values of the data segment in the at least one portion by a given value.

21. The non-transitory computer-readable medium of claim 17, wherein the at least one portion of the electronic document is altered by changing the values of the data segment in the at least one portion by an arbitrarily selected displacement.

22. The non-transitory computer-readable medium of claim 17, wherein the error is at least one of: a crash of the corresponding program and a recognizable error state.

23. The non-transitory computer-readable medium of claim 17, wherein the altered electronic document is processed in a sandbox environment.

24. The non-transitory computer-readable medium of claim 17, wherein the method further comprises disabling the malicious code in response to the produced error state.

* * * * *

UNITED STATES PATENT AND TRADEMARK OFFICE
CERTIFICATE OF CORRECTION

PATENT NO. : 8,789,172 B2
APPLICATION NO. : 12/406814
DATED : July 22, 2014
INVENTOR(S) : Salvatore J. Stolfo et al.

Page 1 of 1

It is certified that error appears in the above-identified patent and that said Letters Patent is hereby corrected as shown below:

In the Claims

Column 17, lines 24-25 "at least one portion of the electronic document to produce an altered electronic document;" should be --at least one portion of the electronic document;--.

Signed and Sealed this
Tenth Day of March, 2015

Michelle K. Lee
*Deputy Director of the United States Patent and Trademark Office*